US012444415B2

(12) United States Patent
Tomasic et al.

(10) Patent No.: US 12,444,415 B2
(45) Date of Patent: Oct. 14, 2025

(54) INTERACTIVE SYSTEM USING SPEECH RECOGNITION AND DIGITAL MEDIA

(71) Applicant: Carnegie Mellon University, Pittsburgh, PA (US)

(72) Inventors: Anthony Tomasic, Forth Worth, TX (US); Erik Thiessen, Pittsburgh, PA (US); Cassondra Eng, Pittsburgh, PA (US); Amy Ogan, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 146 days.

(21) Appl. No.: 17/974,272

(22) Filed: Oct. 26, 2022

(65) Prior Publication Data

US 2023/0131393 A1    Apr. 27, 2023

Related U.S. Application Data

(60) Provisional application No. 63/408,397, filed on Sep. 20, 2022, provisional application No. 63/271,736, filed on Oct. 26, 2021.

(51) Int. Cl.
*G10L 15/22* (2006.01)
*G10L 15/08* (2006.01)
*H04N 21/422* (2011.01)

(52) U.S. Cl.
CPC .............. *G10L 15/22* (2013.01); *G10L 15/08* (2013.01); *H04N 21/42203* (2013.01); *G10L 2015/088* (2013.01); *G10L 2015/223* (2013.01)

(58) Field of Classification Search
CPC ... G10L 15/22; G10L 15/08; G10L 2015/088; G10L 2015/223; H04N 21/42203; H04N 21/8541; H04N 21/8545; G06F 3/167; G09B 7/04; G09B 17/003
See application file for complete search history.

(56) References Cited

U.S. PATENT DOCUMENTS

| 11,145,306 B1 * | 10/2021 | Harris ................... G06F 3/0482 |
| 12,063,423 B1 * | 8/2024 | Neuweg ............. H04N 21/8541 |
| 2008/0222552 A1 * | 9/2008 | Batarseh ............... G06F 3/0483 |
| | | 715/776 |
| 2014/0234809 A1 * | 8/2014 | Colvard ............... G09B 17/006 |
| | | 434/169 |

(Continued)

OTHER PUBLICATIONS

International Preliminary Report on Patentability in International Appln. No. PCT/US2022/047831, mailed on May 10, 2024, 8 pages.

(Continued)

*Primary Examiner* — Bhavesh M Mehta
*Assistant Examiner* — Jangwoen Lee
(74) *Attorney, Agent, or Firm* — Fish & Richardson P.C.

(57) ABSTRACT

A system for interactive system using speech recognition and digital media is described. The system uses automated speech recognition and recognizes interactions from users to execute digital media items. The interactions are based on behavior of the user. The user is given a prompt. If the student responds to a prompt correctly, the student is rewarded with an animation. Otherwise the user experience continues without a reward. The system recognizes natural language responses for interactions of the user. The media item is dynamically generated as the user interacts with the digital media item.

21 Claims, 17 Drawing Sheets

(56) References Cited

U.S. PATENT DOCUMENTS

| | | | |
|---|---|---|---|
| 2017/0127135 A1* | 5/2017 | Chung | A63F 13/52 |
| 2019/0057722 A1* | 2/2019 | Key | H04N 21/25866 |
| 2021/0014452 A1* | 1/2021 | Rocklin | G06Q 50/01 |

OTHER PUBLICATIONS

Eng et al., "Contingent Responsiveness in Digital Storybooks: Effects on Children's Comprehension and the Role of Individual Differences in Attention," Paper Submission at the Cognitive Science Society Annual Meeting, Madison, WI, Jul. 2018, 6 pages.

Eng et al., "Contingent responsivity in E-books modeled from quality adult-child interactions: Effects on children's learning and attention," Developmental Psychology, Feb. 2020, 56(2):285-297.

International Search Report and Written Opinion in International Appln. No. PCT/US2022/047831, mailed on Feb. 1, 2023, 16 pages.

Kaminski et al., "Best practices in using Dynamic Indicators of Basic Early Literacy Skills for formative assessment and evaluation," Best Practices in School Psychology V, 2008, 4:1181-204.

Stamper et al., "Experimental Evaluation of Automatic Hint Generation for a Logic Tutor" International Journal of Artificial Intelligence in Education 22, 2013, 22(1-2):3-17.

Wikipedia.org [online], "Michelene Chi," Oct. 15, 2022, retrieved on Feb. 27, 2023, retrieved from URL<https://en.wikipedia.org/wiki/Michelene_Chi>, 5 pages.

\* cited by examiner

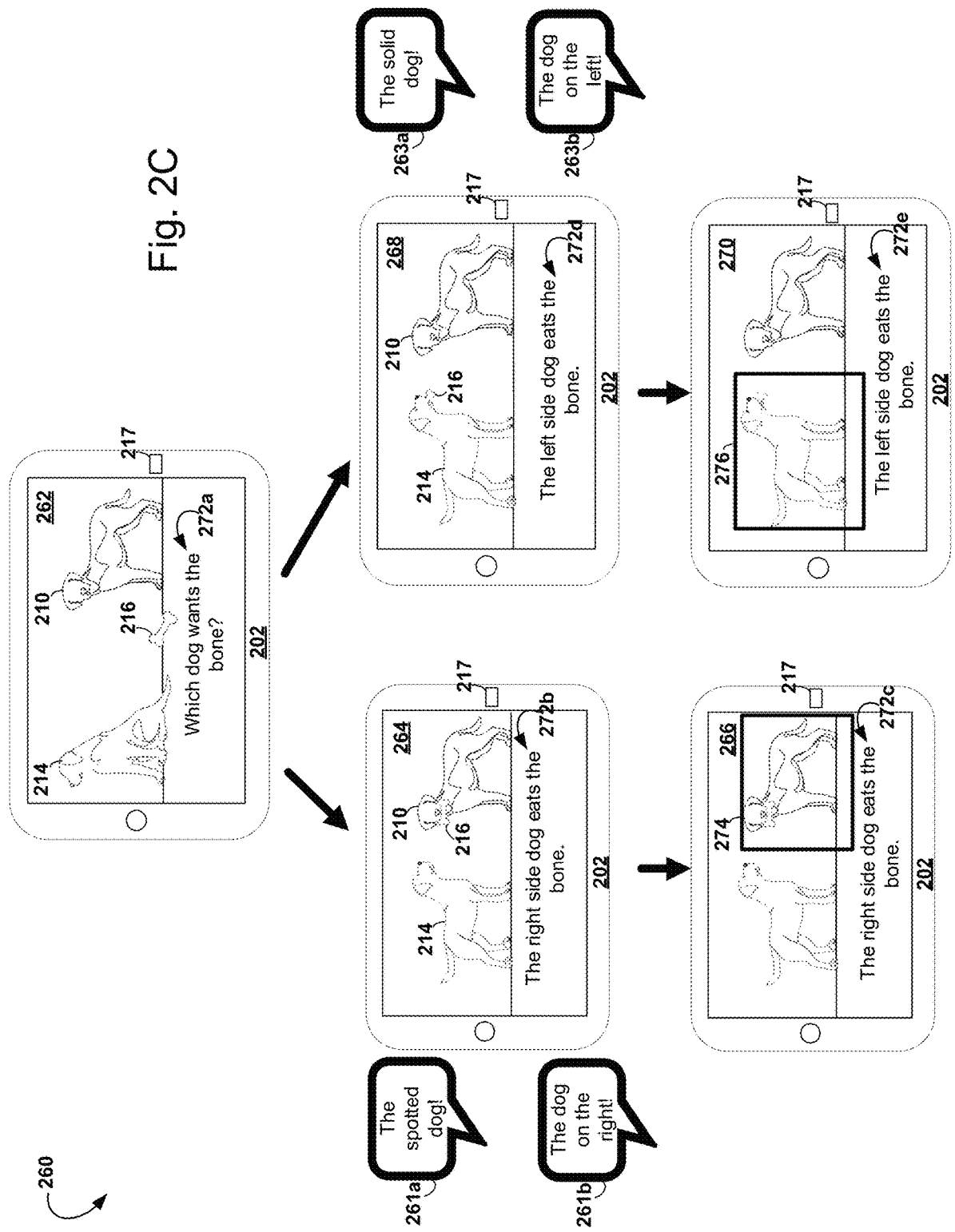

INTERACTIVE SYSTEM USING SPEECH RECOGNITION AND DIGITAL MEDIA

CLAIM OF PRIORITY

This application claims priority under 35 U.S.C. § 119(e) to U.S. Provisional Application Ser. No. 63/271,736, filed on Oct. 26, 2021 and to U.S. Provisional Application Ser. No. 63/408,397, filed on Sep. 20, 2022, the entire contents of each of which are hereby incorporated by reference.

TECHNICAL FIELD

This disclosure generally relates to interactive digital media items that incorporate speech recognition based on artificial intelligence. More specifically, this disclosure relates to media items that are configured to assist users in learning to read by generating customized interactions that are tailored to actions taken by the users, such as during reading a digital book.

SUMMARY

This disclosure describes an artificial intelligence-based automated speech recognition digital media that implements a set of interaction designs. The initial users of the system can generally be preschool aged children. However, the novel interaction innovation applies to learners of any age and any subject area.

Generally, the user (e.g., a student) does not yet read fluently, can hear and speak the English language at an age-appropriate level, and can observe the contingent feedback. The system also supports multiple other stakeholders of the student's education. For parents, the system contains classic media from well-known authors. For teachers, the system tracks the performance of the student over time with internal metrics, such as the number of media read, the vocabulary the student has experienced, and the performance of the student with respect to the number of contingent interactions experienced. For administrators, the system demonstrates that it systematically improves performance for students in reportable standardized metrics such as PPVT-IV or DIBELS. Thus, deploying this system across a school system improves vocabulary comprehension and literacy skills for the student body.

A function of the system is to create an interactive student experience based on speech recognition. In the system, a contingent interaction is implemented to generate animations based on the student's speech. Animations represent the meaning of verbs and nouns in the text. For example, when a student vocalizes a text "fix the headlight," an animation of a wrench turning and car's headlight flashing on and off is played.

Other interactions are supported. For example, at the end of the media content, the system emits an audio that asks "What do you think will happen tomorrow?". The student might respond, "The cars will drive home". This phrase will generate a new image of a car and a home as a way of representing the construction of new information by the student.

A third interaction displays side-by-side the media created by two students. One of the media created as the result of the student's own efforts. The student is asked to compare and contrast their created media with another student's media. The system asks the student "How are these two examples of tomorrow the same?" The student might respond "They both have cars". The system would then confirm this statement by highlighting both cars, drawing a circle around each car, and drawing a line between the two circles to illustrate that both cars exist. The system might also ask "How are these two examples different?" and the student might respond "Mine has a house". The system would highlight the house in this case.

The platform of the system is by default a tablet device configured with network access. Other platforms are possible, such as a smartphone or desktop computer, or augmented reality glasses. In the case of a retail student, the system is downloaded from a public distribution site for applications. In the case of a large-scale deployment in a school district, a fleet of these tablets are connected via a network to a monitoring and control platform located in the cloud. This platform provides security, single point of deployment control, real-time reporting of use, and longitudinal tracking of student performance.

The platform can enable one or more technical advantages. Speech recognition-based contingent interaction for media produces a robust and reliable improvement in story comprehension. Such story comprehension was measured by a story-specific questionnaire given to the children after reading a book, focused on details such as plot, character, and setting. In this within-participant experiment design, users are much more likely to be able to answer questions about an experience with contingently interactive media than questions about an experience with media that was presented without these contingent interactions. A degree to which users show greater comprehension after reading an interactive story media (a pattern that was true of nearly all participants) is shown to be linearly correlated with a user's lack of ability to focus. This counter-intuitive result demonstrates that contingent interaction is particularly engaging for students with attention issues, allowing them to better focus on the material and remember information from the story.

To scale up the interaction so that a laboratory experience can be delivered in an application, the system uses text-to-speech synthesis, automatic speech recognition, onboarding, and an end-of-story questionnaire. This design allows users to operate the application without additional help (e.g., a parent or teacher can supervise the interaction). Additionally, scaling up in a school setting enables assessment of what effect interacting with the contingent interaction may have on academic achievement.

The system encompasses a complete educational delivery system that scales-out to create content at low cost, and supports the innovation. The components of the system include media content, the animated version of the media, associated curricula materials, the digital library of media, a distribution channel, the student (& support personnel) experience, and an artificial intelligence (AI) analysis component.

The components are organized in a pipeline (with design and data feedback from each step to prior components) that emphasizes the steps involved in producing the novel interactions in the field. In practice, the process of constructing a media content is more iterative and some steps may be skipped.

The pipeline starts with the original media created by the media authors and illustrators. To support our interaction, the media is augmented by an animator with some additional content that includes animation and speech-recognition text. The result is a combination of this system and media that delivers the interactions. This system is given to an educator to augment with curricula materials and activities (both digital and physical).

The result is added to the digital library. The library contents are delivered to a distribution mechanism to the public or to a school system, managed by the engineering and operations team. The distribution system integrates with on-line shopping (for physical material) and digital storefronts and educational platforms that intelligently selects material for students based on analysis of prior student interactions. From the distribution platform, media are delivered to students in an educational setting, where the student, supported by parents, caregivers and teachers, experiences and interacts with the media. This interaction is monitored and scored by an analysis component. The analysis is based on artificial intelligence. The results of the analysis then provides feedback to all the components, producing a continuously improving environment.

The one or more advantages described can be enabled by one or more aspects or embodiments of the system.

In a general aspect, a server system includes a data store configured to store one or more data items each representing at least a portion of a given media item. The system includes an interface in communication with the data store, the interface configured to enable a user to input one or more instructions specifying a playback configuration for the given media item. The system includes a controller in communication with the interface and the data store. The controller is configured to perform operations comprising: receiving at least one instruction specifying a portion of a media item and at least one event associated with the portion of the media item, the at least one event representing a solicitation of a user input to a playback device during playback of the portion of the media item by the playback device, the user input specifying one or more objects, concepts, or both objects and concepts related to the portion of the media item; and generating, based on the at least one instruction, executable code representing a playback configuration of the portion of the media item. The playback configuration comprising: generation of additional media based on the user input, the additional media representing at least one of the objects, concepts, or both objects and concepts; incorporation of the additional media into the portion of the media item; and playback of the portion of the media item of the additional media incorporated into the portion of the media item.

In some implementations, the operations further include receiving a plurality of instructions each specifying a respective portion of the media item and at least one event associated with the respective portion of the media item, each respective portion of the media item being different from other portions of the media item; for a respective portion of the media item, determining at least one criterion for playback of the respective portion of the media item; and determining at least one reward included in the playback of the portion of the media item responsive to satisfying the at least one criterion, the reward including the additional media; determining an order of the different portions of the media item for chronological playback of the media item; and generating, based on the order, the executable code representing the playback configuration of the portions of the media item together in an interactive media item, the playback configuration including, for each portion of the media item, the at least one reward included in the playback of the portion of the media item responsive to satisfying the at least one criterion.

In some implementations, the event comprises a detection, by a sensor associated with a playback device configured to execute the executable code, of an audio signal representing a term or a phrase specified in the instruction.

In some implementations, the playback comprises, responsive to the event, an animation of at least a portion of a visual presentation. In some implementations, the portion of the visual presentation comprises an object that is described by the term or the phrase specified in the instruction.

In some implementations, the event comprises a detection, by a sensor associated with a playback device configured to execute the executable code, of a lack of an audio signal responsive to playback of the portion of the media item.

In some implementations, the playback comprises, responsive to the event, a repeat of the playback of the portion the media item without an animation.

In some implementations, the media item comprises an electronic book, and wherein the portion of the media item comprises a page of the electronic book.

In some implementations, the data store comprises a cloud based data store.

In some implementations, the interface comprises an application programming interface (API).

In a general aspect, a device configured for presenting an interactive media item. The device includes a user interface configured to present portions of an interactive media item to a user; at least one sensor configured to measure an interaction of the user with the user interface and generate sensor data representing the interaction; and a controller configured to receive the sensor data from the at least one sensor, the controller configured to perform operations comprising: causing, by the user interface, a presentation of a portion of the interactive media item; obtaining sensor data indicative of a particular interaction with the portion of the interactive media item; determining whether the particular interaction with the portion of the interactive media item satisfies one or more criteria; in response to determining that the one or more criteria are satisfied: generating a reward media item associated with the portion of the interactive media item, the reward media item related to one or more objects or concepts represented by the particular interaction; incorporating the reward media item into the portion of the interactive media item; and causing presentation of the interactive media item incorporating the reward media item; in response to determining that the one or more criteria are not satisfied, causing the presentation of the portion of the interactive media item to repeat without presentation of the reward media item.

In some implementations, the operations further comprise: receiving, based on a playback of a second instance of the interactive media item, data representing a second interaction with the second instance of the interactive media item; comparing the second interaction with the second instance of the interactive media item to the particular interaction with the portion of the interactive media item; generating, based on the comparing, a first new media item for incorporation in the interactive media item, the new media item comprising a result of the comparison and a solicitation for a user input based on the result of the comparison; and generating, responsive to receiving the user input, a second new media item representing at least one object or concept represented in the user input.

In some implementations, the sensor data comprises a representation of an audio signal including a term or a phrase.

In some implementations, the one or more criteria comprise detection, by the sensor, of an audio signal including a predetermined term or phrase.

In some implementations, the reward media item comprises animation of an object included in the portion of the interactive media item, the object being described by the term or the phrase.

In some implementations, the sensor comprises a microphone.

In some implementations, the sensor comprises a camera, and wherein the sensor data comprises a video.

In some implementations, the one or more criteria comprise detection of a gesture or action by the user, and wherein the controller is configured to detect one or more gestures of the user in the video.

In some implementations, the interactive media item comprises an electronic book, and wherein the portion of the interactive media item comprises a page of the electronic book.

In some implementations, the sensor comprises a touch sensor.

In some implementations, the one or more criteria comprise detection of a touch signal representing touching of a particular object presented in the portion of the interactive media item.

The details of one or more embodiments of these systems and methods are set forth in the accompanying drawings and the description to be presented. Other features, objects, and advantages of these systems and methods are apparent from the description and drawings, and from the claims.

BRIEF DESCRIPTION OF THE DRAWINGS

FIG. 2C shows an illustration of an example presentation of interactive digital media using speech recognition.

DETAILED DESCRIPTION

Figure 1A:
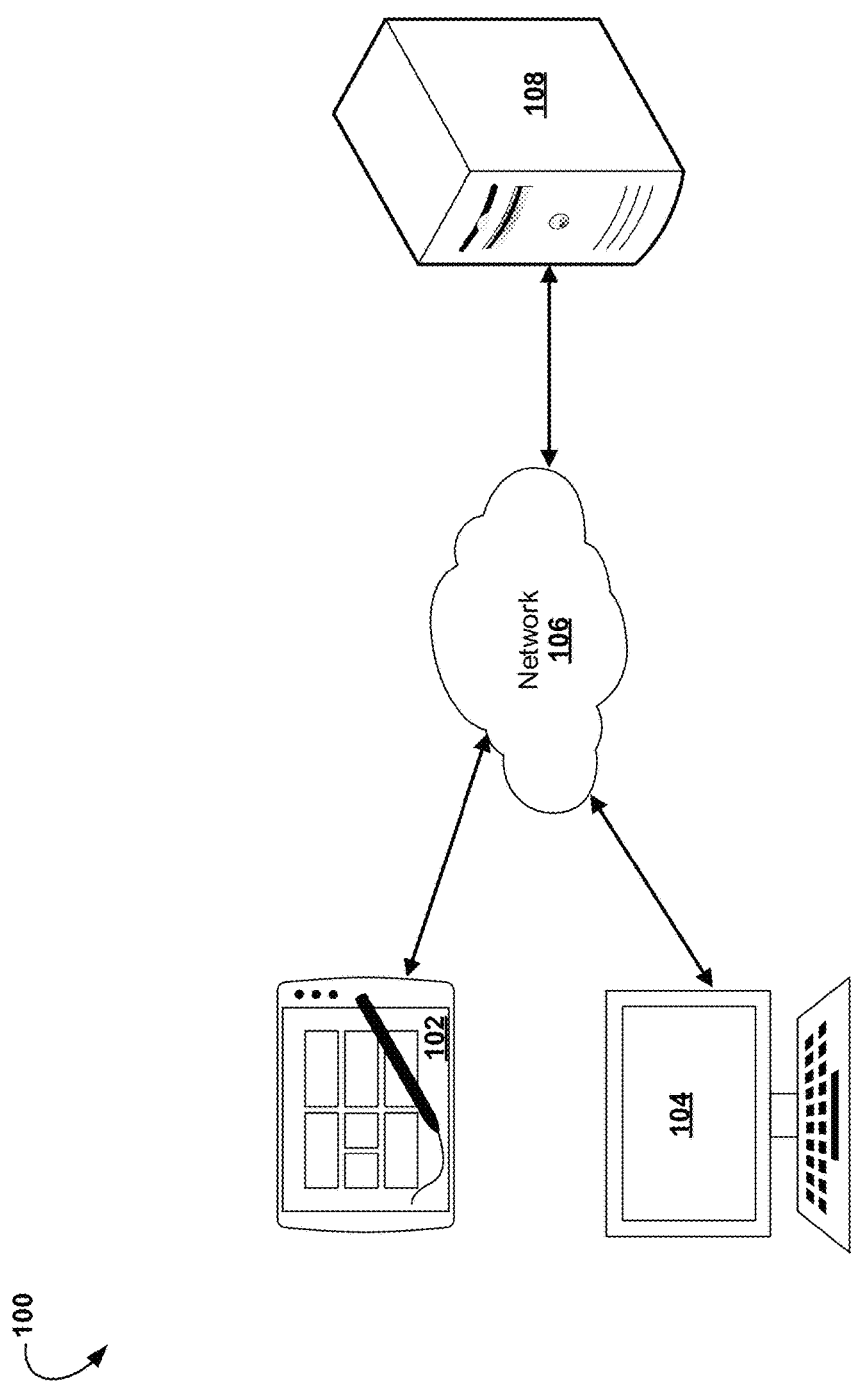
FIG. 1A is a block diagram illustrating an interactive system using speech recognition for presentation of digital media.

FIG. 1A is a block diagram illustrating an interactive system 100 using speech recognition for presentation of digital media. The system 100 includes one or more client devices, such as a tablet 102 or another computing device 104. These are connected over a network 106 to a server system 108. Each of components 102, 104, and 108 is subsequently described in greater detail.

Figure 1B:
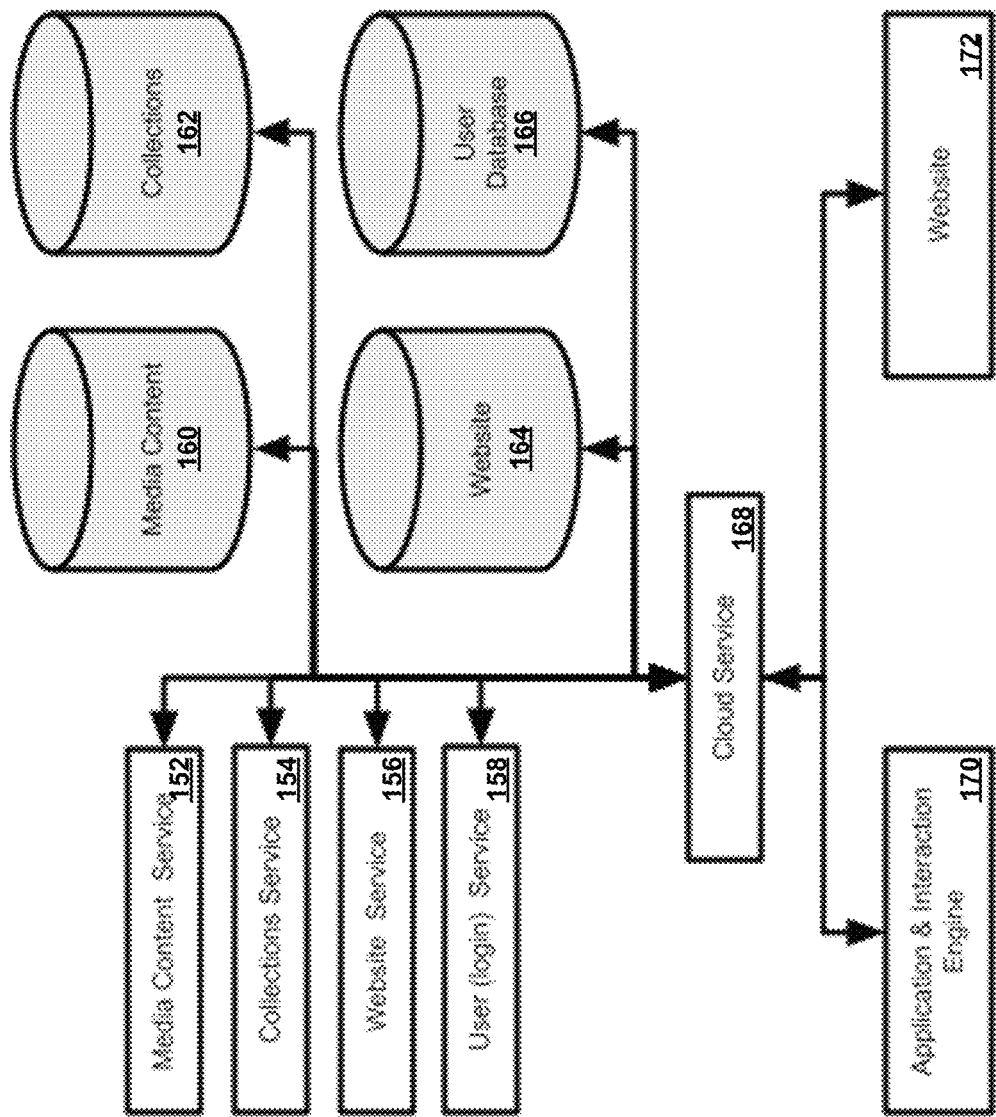
FIG. 1B a block diagram of an interactive system using speech recognition for generation of digital media.

FIG. 1B a block diagram of an interactive system 150 using speech recognition for generation of digital media. The interactive system 150 can be hosted on the server system 108 of FIG. 1A. The system is configured to host interactive media items as subsequently described. The media items can be executed on a client device (e.g., devices 102, 104) using an application and interaction engine 170 installed on the device. In some implementations, the interactive media item is viewable using a website 172.

The system 150 includes data source for storing back-end data. For example, a media content storage 160 is configured to store libraries of objects that are used for the interactive media items. Collections 162 include media files (videos, graphics, pictures, sounds, machine-learning training examples, etc.), interaction scripts, text-to-speech and automatic speech recognition information that are used in media items. The website store 164 includes data supporting a web interface, if applicable. A user database 166 stores user profiles, user responses, user scores, a user library of data items (e.g., purchased books), and so forth.

The system 150 is supported by several services. A media content service 152 accesses the media content 160 store when media content is needed. A collections service accesses the collections store 162 when collections data are needed. A website service 156 accesses the website store 164 when website data are needed. A user login service 158 accesses the user database 166 and accesses user data. These data stores can be connected to each other and the application 170 or website 172 by a cloud service 168 (e.g., over network 106).

Examples of the generation and execution of the digital media items is now described. In a first step, authors and illustrators provide media to the animator. The animator loads this media into the media content editing tool. This tool has been designed to make the creation of the media intuitive and low-cost. The implementation of the tool leverages an existing media content editing tool. The animator adds animations, information required for text-to-speech synthesis, and information for automatic speech recognition. The output of the media content editing tool is the media content: collection of media files (videos, graphics, pictures, sounds, machine-learning training examples, etc.), interaction scripts, and text-to-speech and automatic speech recognition information.

To create an application, the media content is coupled with a software development kit (SDK). The SDK contains the runtime interaction engine described in the next section, plus other tools.

Interaction scripts are generated. An intersection script defines the algorithm for the student experience of media content. A script contains a series of segments and each segment contains a series of actions. Actions represent interactions and conditional branching through the segments. Loops are implemented by branching backwards in the series of segments.

The interaction script grammar describes the legal format for interaction scripts. The syntax of an interaction script is JSON plus a JSON schema. An instance of the interaction script grammar is one of the inputs to the runtime interaction engine.

The code snippet below shows a JSON schema for the interaction scripts in YAML format.

```
                type: map
                mapping:
                    author:
                        type: any
                    title:
                        type: any
                    cover-image:
                        type: any
                    description:
                        type: any
                    content:
                        type: seq
                        sequence:
                            - type: map
                              mapping:
                                page:
                                    type: map
                                    mapping:
                                        name:
                                            type: str order:
                                            type: seq sequence
                                                - type: str
                                        actions:
                                            type: seq
                                            sequence:
                                                - type: map
                                                  mapping:
                                                    name:
                                                        type: str
                                                    type:
                                                        type: str
                                                    data:
                                                        type: any
```

Figure 7:
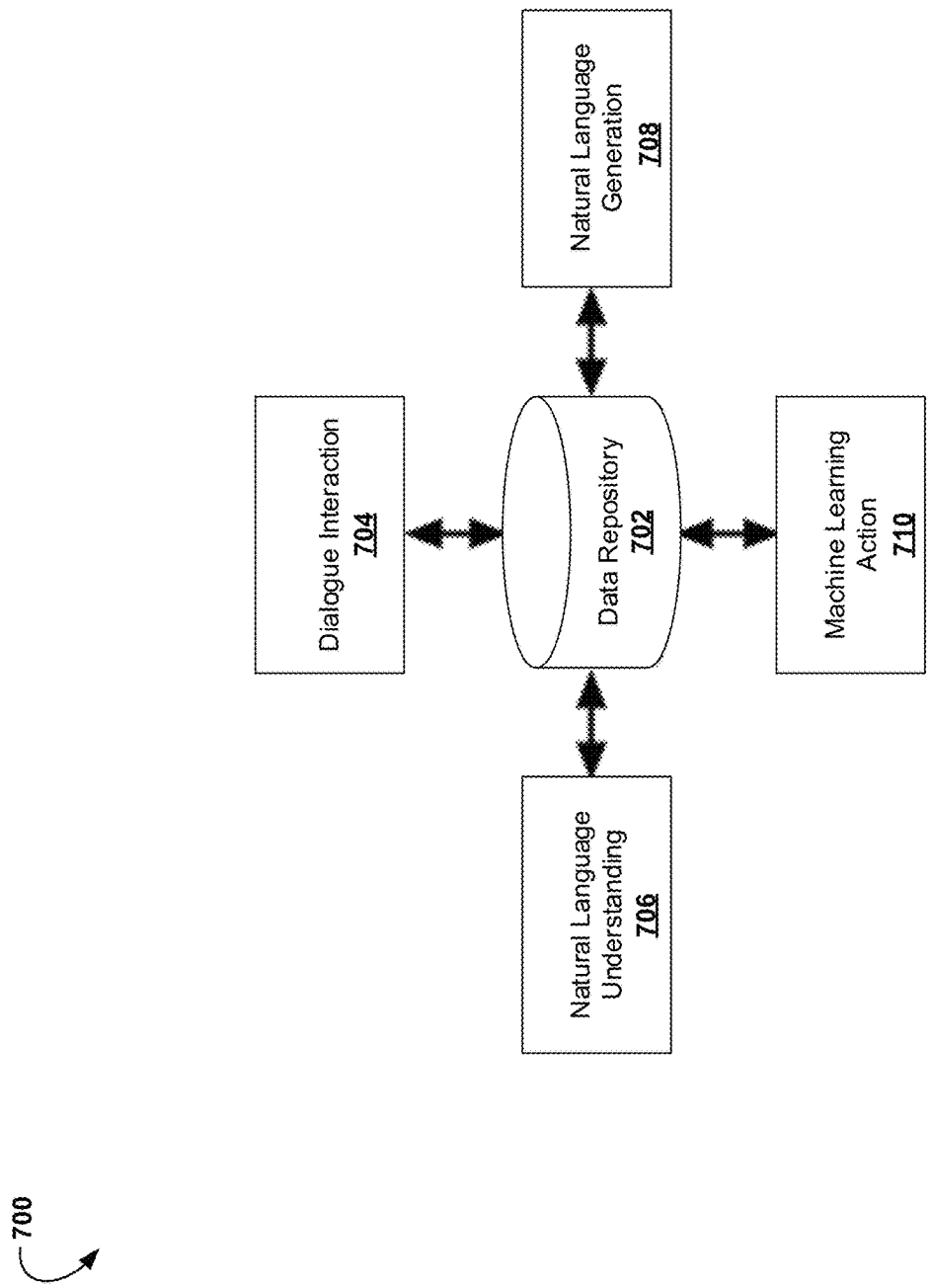
FIG. 7 shows an example of processing modules that interact for generation and presentation of interactive digital media using speech recognition.

The interaction script for the runtime interaction engine is a JSON object. (FIG. 7 is the JSON schema for interaction scripts in YAML format.) At the top level the object is a collection of name/value pairs. The AUTHOR, TITLE, COVER-IMAGE, and DESCRIPTION name/value pairs contain metadata about the media content. These name/value pairs are optional and other name/value pairs may appear. The CONTENT name has a value that is an array of objects. Each object describes either a PAGE or an ACTION of the media content.

A page object contains two name/value pairs. The PAGE name has the default semantics here are to start execution with a special PAGE NAME of "cover" (as in book cover). The subsequent sequence of pages is determined by which actions are executed by a page. The ACTIONS are a sequence of dictionaries. An ACTION has a NAME, TYPE, and some DATA. The DATA may contain a collection of CONDITION-ACTIONS. An action is effectively the name of a procedure call. The call is dispatched to a function associated with the TYPE along with the associated DATA. After the call returns, each CONDITION-ACTION is a Boolean function that is evaluated in the associated TYPE function. If the CONDITION is true, control passed to the associated ACTION. If no CONDITION is true, the runtime interaction engine by default moves to the next page.

This code snippet shows an example interaction script. The book consists of two pages, a cover page and a page1. The page 1 has three actions. Two actions are of type media and one action is of type regular.

author: Homer Quan title: Example Book
cover-image: example-cover.jpg
description: An example interaction script for a book
    content:

```
            - page:
                name: cover order: [ P0A1 ]
            - page:
                name: page1
                order: [ P1A1, P1V1, P1A1A ]
            - actions:
                - name: P0A1
                    type: media
                    data: { clips: [ M1, M2 ] }
                - name: P1A1
                    type: media
                    data: { clips: [ S1 ], playOnce: true }
                - name: P1V1
                    type: regular
                    data:
                        expect: [ "cat's pajamas" ] duration: 5000
                        confidence: 0.6
                        successAction: P1A1A
                        failureAction: P1A1
```

Note that the entire script is simply data. The execution of the script sequencing logic is done by the runtime interaction engine, and the interpretation of any TYPE and CONDITION-ACTIONS are with the associated function. Thus, the interactions of the system are represented by the set of TYPE functions.

Interaction Types in Scripts are now described. Table 1 shows interaction types.

TABLE 1

Interaction Types.

| Type | Description | ICAP |
| --- | --- | --- |
| media | Play media | passive |
| construct | Generate or construct media | ICAP |
| single | Regular voice recognition of a single phrase | active |
| multiple | Recognize a set of possibilities | active |
| nlu | Natural language understanding recognition | constructive |
| converse | Interactive - open conversation with context | interactive |
| cc | Interactive - compare and contrast | interactive |
| eval | Evaluation interaction | active |

Table 1 shows interaction types. Each line of the table corresponds to a type of interaction. The TYPE column lists the name of the type in the interaction script. The description column gives a brief description of the interaction. The ICAP column states the relationship between the interaction and ICAP learning theory.

The code snippet below shows an example interaction script.

```
            {
            "playmedia": {
                "cover": [ "P0A1" ],
                "page1": [ "P1A1", "P1V1", "P1A1A" ] }
            "actions": {
                "P0A1": {
                    "type": "media",
                    "data": { "clips": [ "M1", "M2" ] } } "P1A1": {
                    "type": "media",
```

```
    "data": {
      "clips": ["S1"],
      "playOnce": true } },
  "P1V1": {
    "type": "regular",
    "data": {
      "expect": [ "cat's pajamas" ],
      "duration": 5000,
      "confidence": 0.6, "successAction"
      "P1A1A", "failureAction": "P1A1" } } }
```

Figure 4:
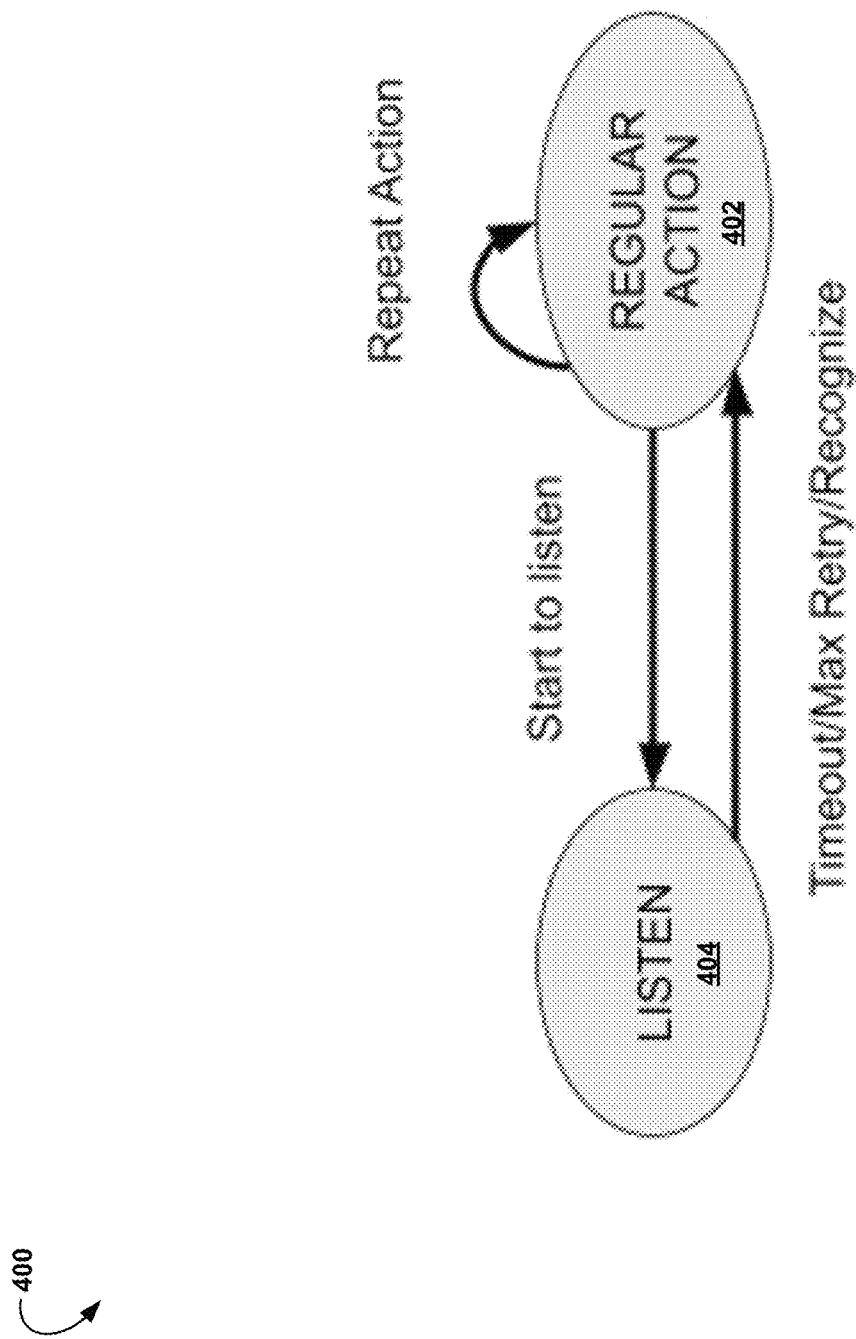
FIG. 4 shows an example of a state machine for presentation of interactive digital media using speech recognition.

For example, FIG. 4 contains an example interaction script. The script contains two pages identified as "cover" and "page1". The "cover" page contains a single action identified as "P0A1" (page 0, animate 1). The "page1" page contains three actions, identified as "P1A1" (page 1, animate 1), "P1V1" (page 1, voice 1), and "P1A1A"—the details of this last action are not listed in the example. Note that the format of the identifiers have no additional meaning—the format is simply a convention.

The action "P0A1" has the type "media" and contains two clips identified as "M1" and "M2". The clip identifiers correspond to the keys that identify media files that are part of the application. The action "P1A1" also has the type "media" and contains one clip identifier "S1". The action contains an additional argument, passed to the code of the action, "playonce: true" that tells the implementation of the media action to play the "S1" media once. The "P1V1" action is a regular voice interaction. The additional data, passed as information to the execution of the action, contains the information required to execute the voice interaction. The "expect" data element contains a list of strings that are expected to be spoken. In this case there is a single string "cat's pajamas". The "duration" data element is the milliseconds required to wait before terminating speech recognition. The "confidence" is the minimum required score for a successful match.

The score is computed by comparing what was recognized by the automated speech recognition (ASR) system to any one of the expected strings. The comparison computation is a heuristic based on the edit distance between the two strings, or other more sophisticated machine-learning based algorithms [xxx]. The "successAction" value of "P1A1A" is the action to visit if the regular voice interaction action computes a successful match between the spoken text recognized by the ASR and the "expect" strings. The "failureAction" value of "P1A1" is the action to visit if there is no successful match.

Converting an animated media to a curricula is now described. The step from animated media to curricula involves the addition of curricula material to integrate media content into a curriculum. This material is optional. The material typically consists of additional instructions or modeling behavior for the use of the media content plus additional material related to the content of the media. This curricula material is added to the media content.

Figure 5:
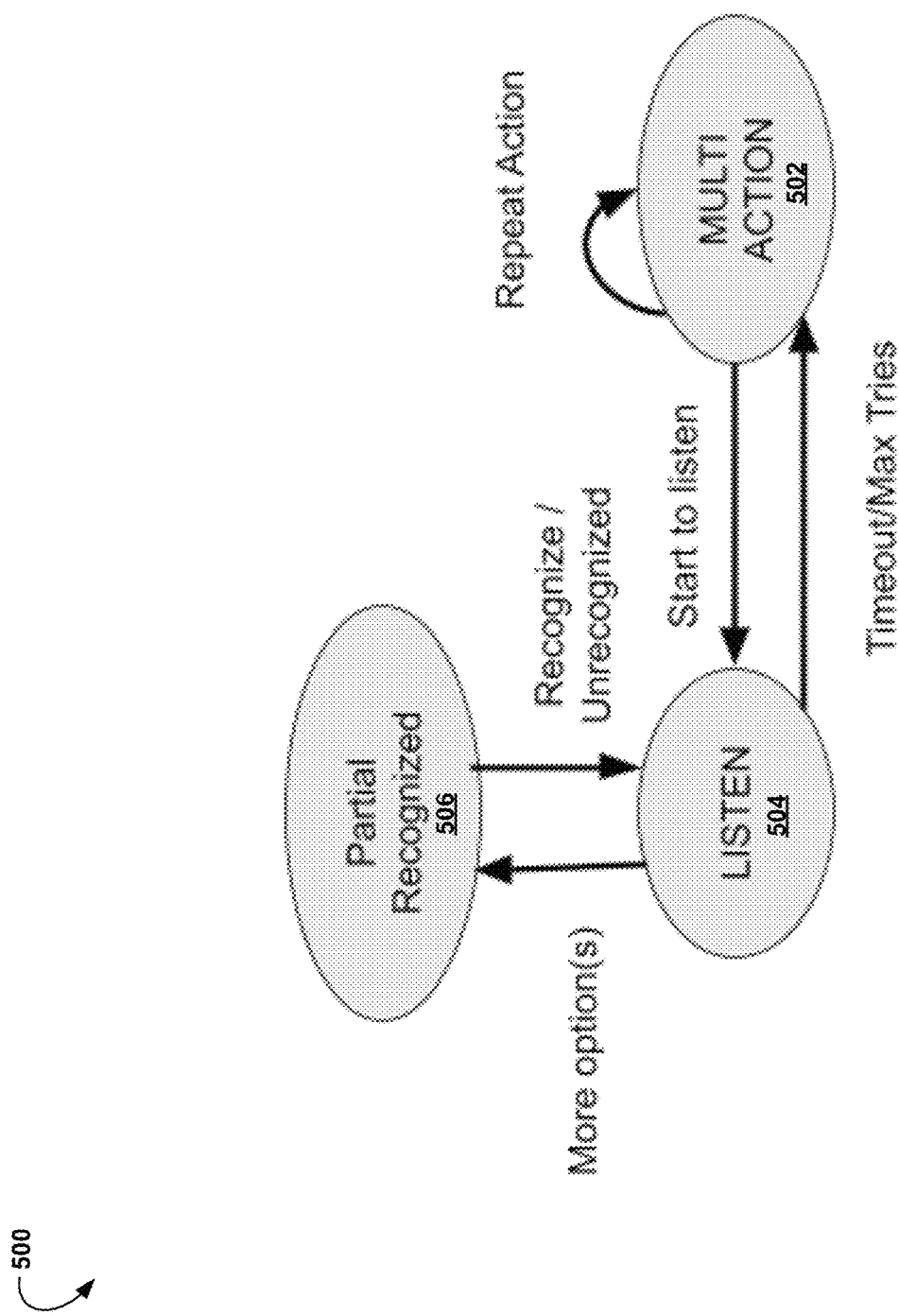
FIG. 5 shows an example of a state machine for presentation of interactive digital media using speech recognition.

A curricula to a digital library is now described. The media content, and any associated curricula, is then added to a digital library. The digital library has four repositories of information (FIG. 5). The media content repository contains the data and metadata of the media content. The collections repository also contains media content (for the curricula) and links between collections and media contents. The links group subsets of media contents into different collections (perhaps overlapping). The website repository contains the information of the website, plus additional repository for indexes for searching, recommendations datasets for machine learning, etc. The user database contains the student login information, a log of all activity of the media contents (used for learning AI science analysis), lists of favorite media contents, social network commentary, personal information, and information linking the student to instructors, or administrator, to track access to collections and media contents. The user database also contains information about instructors, administrators, school districts and other organizations. Each repository has an associated service that provides access to the repository and additional functionality.

The entire digital library resides on a cloud service. This service integrates with Google Play and the Apple App store so that the student can download the application. From the application, the student can access the content of the digital library. Access to the digital library is also available from the web through standard browsers.

A digital library to distribution is now described. The distribution mechanism is the upload of the application to cloud-based application services (e.g., Google Play or Apple App store). For the retail segment this distribution is direct to the consumer, but the app can also be distributed through enterprise application management services. These latter services are typically used for schools and other educational institutions. At this point pricing information is also determined.

A distribution to a student experience is now described. In this step, the student downloads the application onto their device (typically a phone or tablet 102 or computing device 104). If necessary, the student logs into the digital library through the application. The student then downloads media contents and collections. The student selects media content. The RIE executes the media content in collaboration with the student. Each type delivers an experience through the application that can be classified according to ICAP learning theory. ICAP stands for Interactive, Constructive, Active, or Passive.

A passive learning experience is now described. The passive learning experience is delivered through the media type action interaction. This interaction plays media and the student passively absorbs the experience. Passive learning is the least effective form of learning.

An active learning experience is now described. The active learning experience occurs when the student actively engages in the material. The active learning experience requires the student to think about and react to the media experience in some way. The student experiences some media and responds to it, either by repeating, or answering a question that requires a rote answer.

A constructive learning experience is now described. The constructive learning experience occurs when the student actively engages in the media and then synthesizes or constructs new material based on the media. Constructive experiences have a wide range. For example, after experiencing our media content, the student can be asked "What happens tomorrow in the story"? The student's verbal answer can be recorded and then interpreted as new media. In some cases this media is simply the textual form of the student's verbal answer. But in other cases the interaction can be used to generate a visual representation of the student's answer.

An interactive learning experience is now described. The interactive learning experience occurs when the student compares, contrasts or otherwise creates new content with the constructive learning experience material of another student (the other student may be a human or artificial agent). The result of the comparison, contrast or other interaction is a new material that represents the additional learning of the student.

In the last step of the pipeline, the log of the student experience is used to populate a set of learning science machine-learning algorithms. These algorithms produce reports about the performance of each component in the pipeline. The reports are then used to improve each step of the pipeline. Typically, an A/B experimental design is used where a specific variation of media content is introduced. For example, in version A, the speech for a media content is generated artificially. In version B, the speech is recorded as human speech. Before a student experiences the media, the system randomly and with equal probability, selects either experience A or B. Both experiences are logged.

Then a series of regressions are computed on various independent variables found in the log of the student experience of the media content: amount of time spent on the media content experience, number of questions in the questionnaire at the end of the experience that were answered correctly, a binary variable indicating that the media content experience was abandoned, etc. The results of these regression tests for statistical significance can inform animators about the choices they make for the addition of animation to media content.

Another classical algorithm uses programmed learning to recommend different media content experiences to a child. In this case, the algorithm is choosing different media content based on the category of content and the student performance in each category. In the simplest case, the algorithm recommends material in the category with the lowest student performance.

Figure 2A:
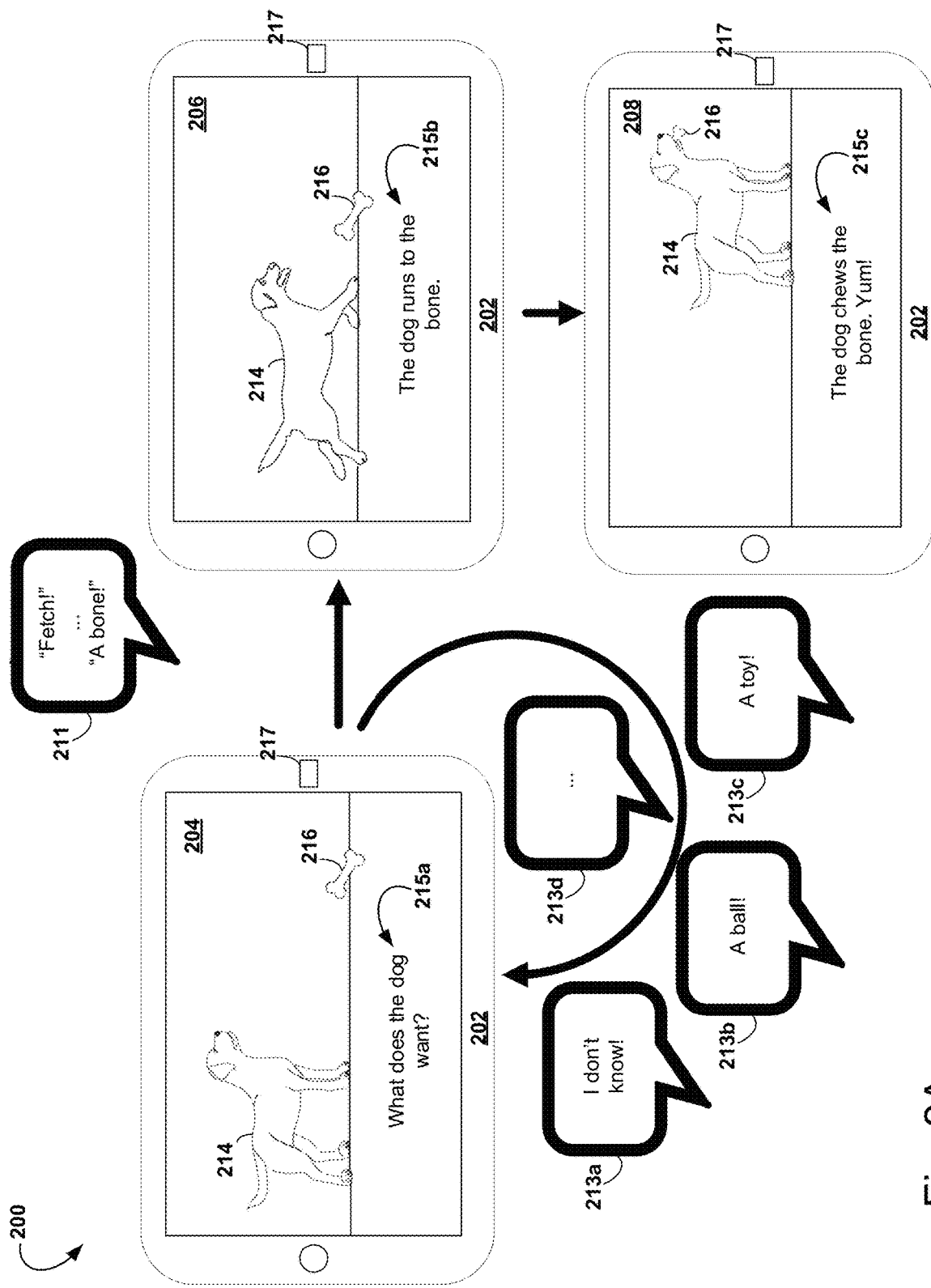
FIG. 2A shows an illustration of an example presentation of interactive digital media using speech recognition.

FIG. 2A shows an illustration of an example presentation 200 of interactive digital media using speech recognition, such as using the systems 100 and 150 of FIGS. 1A-1B. The device 202 can include a tablet, desktop computer, laptop, or other similar computing device, such as devices 102 or 104 described in relation to FIG. 1A. The device 202 displays a media item (e.g., an electronic book). The book advances through a story, such as in scenes (portions) 204, 206, and 208 (shown as different screens on the device 202). Arrows between the scenes 202, 206, and 208 show how the story can advance between the portions of the media item. The media item advances based on interactions of a user (e.g., shown as text boxes 213*a*-*c* and 211) or automatically as the story progresses.

The scenes 204, 206, and 208 described in relation to FIG. 2A and throughout the specification describe either static images or portions of the media item between states of execution of the media item. A scene can include multiple text prompts, animations, objects, settings, backgrounds, and so forth. A scene includes presentation of a portion of a media item relating to a particular logical state between inputs or interactions from a user of the media item. For example, a scene can include recitation of one or more lines of dialogue, one or more actions by objects represented in the scene, depiction of one or more events that occur, and so forth. A scene transitions to another scene when an interaction or input (also called an action) is requested from a user. Once the action occurs, the scene can transition to a subsequent scene if given criteria are satisfied. In some implementations, a scene can correspond to a page of an electronic book. In some implementations, the scene can correspond to a video clip or animation.

As shown in scenes 204, 206, and 208, the media item includes objects 214 and 216. Here, object 214 is a dog, and object 216 is a bone. The objects can be retrieved from a library of objects, as previously described. Based on prompts to the user, user interactions, or both, the objects can interact with one another in different ways. In another example, new objects can be generated and added to the media item, as subsequently described.

In the presentation 200, the dog object 214 is presented and the bone object 216 is presented. A text portion 215*a* of the story is shown. The text 215*a* includes a question (also called a prompt). The question invites an interaction from the user, such as a voice answer. The device 202 is configured to record the interaction with sensor 217 (e.g., a microphone, camera, a touch screen, etc.). Here, a voice interaction 211, 213*a*-*d* is recorded with a microphone. The text question 215*a* is read by the user.

The text 215*a* prompts the user with a question "What does the dog want?" while showing the dog 214 and the bone 216 on the scene. The dog 214 and the bone 216 are objects from an object library. The objects 214, 216 can be moved around the scene, substituted with different objects (e.g., different versions of the objects), animated, changed color, highlighted, and so forth in response to user interactions (e.g., voice commands). In the example shown, a user can give an answer that does not advance the story. For example, the user can give a voice response 213*a*-*d* including "I don't know!" 213*a* or "A ball!" 213*b* or "A toy" 213*c* or simply remain silent 213*d*. In these cases, the story does not advance from the first scene 204, and the question 215*a* can be repeated or rephrased after a period of time passes.

If the user responds with a correct answer, the story can advance to the next scene 206 from the first scene 204. For example, the user can reply with an interaction 211 such as "Fetch!" or "The bone!" In each of these answers, the system 202 interprets the phrase or word as correctly identifying the object 216 (bone) or a potential action (fetch) for the dog object 214. The correct answers, and variations thereof, can be generated manually by the user who configured the story or generated by topic clouds (e.g., generated using machine learning or manually programmed). For example, a machine learning classifier can interpret the reply as successful or unsuccessful based on training data presented to the classifier or based on heuristic data provided by many users. For example, if many users say "fetch," instead of "a bone," an administrator may manually add the reply of "fetch" to the list of correct responses 211.

Once a correct reply is received in voice interaction 211, the device 202 advances the story to scene 206. The scene 206 can show an animation of the dog object 214. The animation may be a separate object stored in the object library than the static object representing the dog in scene 204. A new text portion 215*b* can narrate that "The dog runs to the bone." This advances the story. Once the user reads the text 215*b*, the story can advance to scene 208. In scene 208, the dog object 214 is shown interacting with the bone object 216. The text portion 215*c* updates to narrate that "The dog chews the bone. Yum!" and indicate progression of the story. The progression of the story in scenes 206 and 208 can be called a reward portion of the story that plays in response to a correct answer to the prompt 215*a* in scene 204. The prompt 215*a* therefore requires a criterion be satisfied for the reward scenes 206, 208 to execute. Here, the criterion is that the user, in response to prompt 215*a*, somehow identifies the bone object 216 in the scene (e.g., by identifying the bone) or how the dog object 214 might interact with the bone object 216 (e.g., by running to the bone, fetching the bone, eating the bone, and so forth). In some implementations, the user can select the bone object 216 by touching the bone on the screen to satisfy the prompt 215*a*.

Figure 2B:
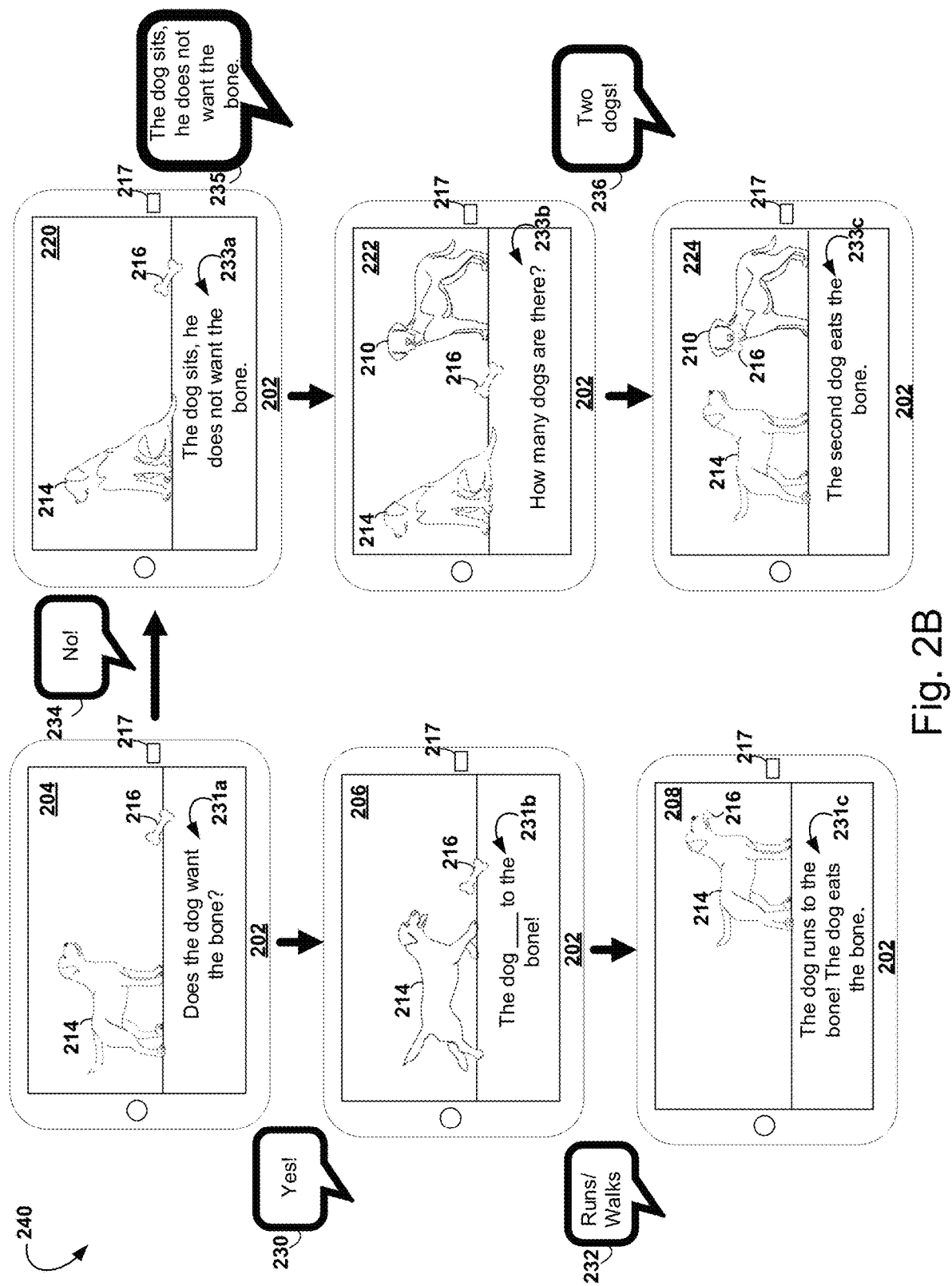
FIG. 2B shows an illustration of an example presentation of interactive digital media using speech recognition.

FIG. 2B shows an illustration of an example presentation 240 of interactive digital media using speech recognition. The device 202 can include a tablet, desktop computer, laptop, or other similar computing device, such as devices 102 or 104 described in relation to FIG. 1A. The device 202 displays a media item (e.g., an electronic book). The book advances through a story, such as in scenes (portions) 204, 206, and 208 (shown as different screens on the device 202), as described in relation to FIG. 2A. Arrows between the scenes 202, 206, and 208 show how the story can advance between the portions of the media item. The media item advances based on interactions of a user (e.g., shown as text boxes 230 and 232) or automatically as the story progresses.

As shown in scenes 204, 206, and 208, the media item includes objects 214 and 216. Here, object 214 is a dog, and object 216 is a bone. The objects can be retrieved from a library of objects, as previously described. Based on prompts to the user, user interactions, or both, the objects can interact with one another in different ways, such as to scenes 220, 222, and 224 instead of scenes 206 and 208.

In scene 204, a prompt 231a is shown asking "Does the dog want the bone?" In contrast to the prompt 215a, the user can answer in different ways to cause the story to proceed with a different set of scenes. In other words, there are different criteria for answering the text prompt 231a to cause the story to proceed in different ways if a particular criterion is satisfied. For example, a user can respond either "Yes", as shown in interaction 230, or "No", as shown in interaction 234. Though these answers 230, 234 are different, each answer satisfies a respective criterion that allows the story to advance in a particular way. For example, if the user says "Yes" as shown in voice interaction 230, the scene 206 is displayed in which the dog object 214 is animated to run to the bone object 216. The text 231b displays a new prompt, requesting that the user complete the sentence "The dog _____ to the bone!" If the user replies with a valid voice interaction 232, the story advances to scene 208, in a similar manner as described in relation to FIG. 2A. For example, the device 202 can determine that any action verb that indicates movement is acceptable to progress the story. The user can reply "Runs," "Walks," "Trots," "Leaps," or any word or phrase that indicates movement of the dog 214 to the bone. The device 202 can require grammatical correctness for the voice interaction 232, such as that the verb is singular. The device 202 can require that the verb be a movement verb. The list of acceptable responses can be determined using natural language processing and/or a machine learning classifier, as described herein. In some implementations, specific responses can be included to seed a topic cloud or can be designated the only acceptable responses, as indicated by the programmer of the media item 240.

In the scene 204, if the user responds "No" as shown in voice interaction 234, the story 240 can proceed to a different set of scenes 220, 222, 224. The scenes 220, 222, 224 can show different animations, include different prompts, and request different voice interactions than scenes 206, 208. In this example, the text 233a says that "The dog sits, he does not want the bone." This is responsive to the voice interaction 234. The story 240 can proceed to scene 222, such as once the user reads aloud the text 233a, as shown in voice interaction 235. Here, the user is responding to a prompt with an answer that requires the user to read the text 233a. In some implementations, each scene 204, 206, 208, 220, 222, 224 can require that any text shown in the story 240 be read by the user before allowing the user to answer a question or proceed to a next scene.

In the scene 222, the dog object 214 and the bone object 216 are joined by a new object, a second dog object 210. The second dog object can be retrieved from the object library. In some implementations, the story 240 can select an object from a set of valid objects for scene 222, and generate a text prompt based on the generated object. For example, if the story 240 generates a cat, the answer to the text prompt 233b would be "One dog" instead of "Two dogs." In another example, an object is selected that will interact with the bone 216. In the scene 210, the new object 210, the second dog, is configured to interact with the bone object 216. The object 210 including the second dog is introduced by appearing on the screen or being animated to enter the scene 222.

Once the user reads the text 233a and provides a voice interaction 235, the scene 22 is presented. The scene 222 include a text prompt 233b that asks the user "How many dogs are there?" The user can respond "Two dogs!" in voice interaction 236. Here, the answer can require that the user identify the correct number of dogs to advance to scene 224.

Once the story 240 advances to scene 224, a text prompt 233c is displayed. The text prompt 233c reports that "The second dog eats the bone." The user can be required to read the text prompt 233c to end the story 240. The scene 224 can include an animation of the dog eating the bone 216. In some implementations, the scene can prompt the user to select an object 214, 210 to eat the bone, and the user can select the first dog object 214 or the second dog object 210 to eat the bone.

FIG. 2C shows an illustration of an example presentation 260 of interactive digital media using speech recognition. The device 202 can include a tablet, desktop computer, laptop, or other similar computing device, such as devices 102 or 104 described in relation to FIG. 1A. The device 202 displays a media item (e.g., an electronic book). The book advances through a story, such as in scenes (portions) 262, 264, 266, 268, and/or 270 (shown as different screens on the device 202), as described in relation to FIGS. 2A-2B. Arrows between the scenes 262, 264, 266, 268, and/or 270 show how the story can advance between the portions of the media item 260. The media item advances based on interactions of a user (e.g., shown as text boxes 261a-b and 263a-b) or automatically as the story progresses.

In the example of FIG. 2C, the user is asked which dog 214, 210 wants a bone 216. Each of the dogs 210, 214, and the bone 216 are objects of an objects library, as previously described. The user is provided a text prompt 272a in scene 262. The text prompt 272a requests that the user select one of the dogs 210, 214 to eat the bone 216. The user can respond with a voice interaction 261a-b identifying the right side dog object 210 or with a voice interaction 263a-b identifying the left side dog object 214. In some implementations, the voice commands are not needed, and instead the user touches the dog object 210 or the dog object 214 on the screen in scene 262. In some implementations, the user drags the bone 216 to the dog object 210 or to the dog object 214.

The voice interactions 261a-b or 263a-b can indicate the desired dog object 210, 214 in one of several ways. For example, the user can identify a position of the dog, such as on the left or on the right. The device 202 is configured to recognize the identified position and associate the identified position with a respective object in the scene 262. Because there are two dogs, the device 202 can associate "left side dog" with object 214 and "right side dog" with object 210. The device 202 detects recitation of the words "left" or "right" (or a similar positional keyword or key phrase) as being in the voice interaction 261b or 263b. The appropriate dog object 210, 214 is selected, and the story 260 progresses.

In another example, the voice interactions 261a-b, 263a-b can identify a property or attribute of the object to be selected. As previously described, each of the objects 210, 214, 216 is associated with metadata including attributes that describe the object. In this example, each dog 210, 214 is associated with a color and/or pattern. The dog object 214 is a "solid" pattern, while the dog object 210 is a "spotted" pattern. The device 202 detects recitation of the words "spotted" or "solid" (or a similar keyword or key phrase) as being in the voice interaction 261a or 263a. The appropriate dog object 210, 214 is selected, and the story 260 progresses.

If the user selects the dog object 210, the story advances to scene 264. The text prompt 272b recites that "The right side dog eats the bone." As previously described, the story 260 can advance to the scene 266 based on the user reading the prompt 272b aloud, or after a period of time passes, and so forth. In the scene 266, the selected object 210 can be highlighted, such as with a box 274, a color change (not shown), bolding the object, flashing the object, or other such highlighting. The text prompt 272c recites "The right side dog eats the bone."

If the user selects the dog object 214, the story advances to scene 268. The text prompt 272d recites that "The left side dog eats the bone." As previously described, the story 260 can advance to the scene 270 based on the user reading the prompt 272d aloud, or after a period of time passes, and so forth. In the scene 270, the selected object 214 can be highlighted, such as with a box 276, a color change (not shown), bolding the object, flashing the object, or other such highlighting. The text prompt 272e recites "The left side dog eats the bone."

Figure 3:
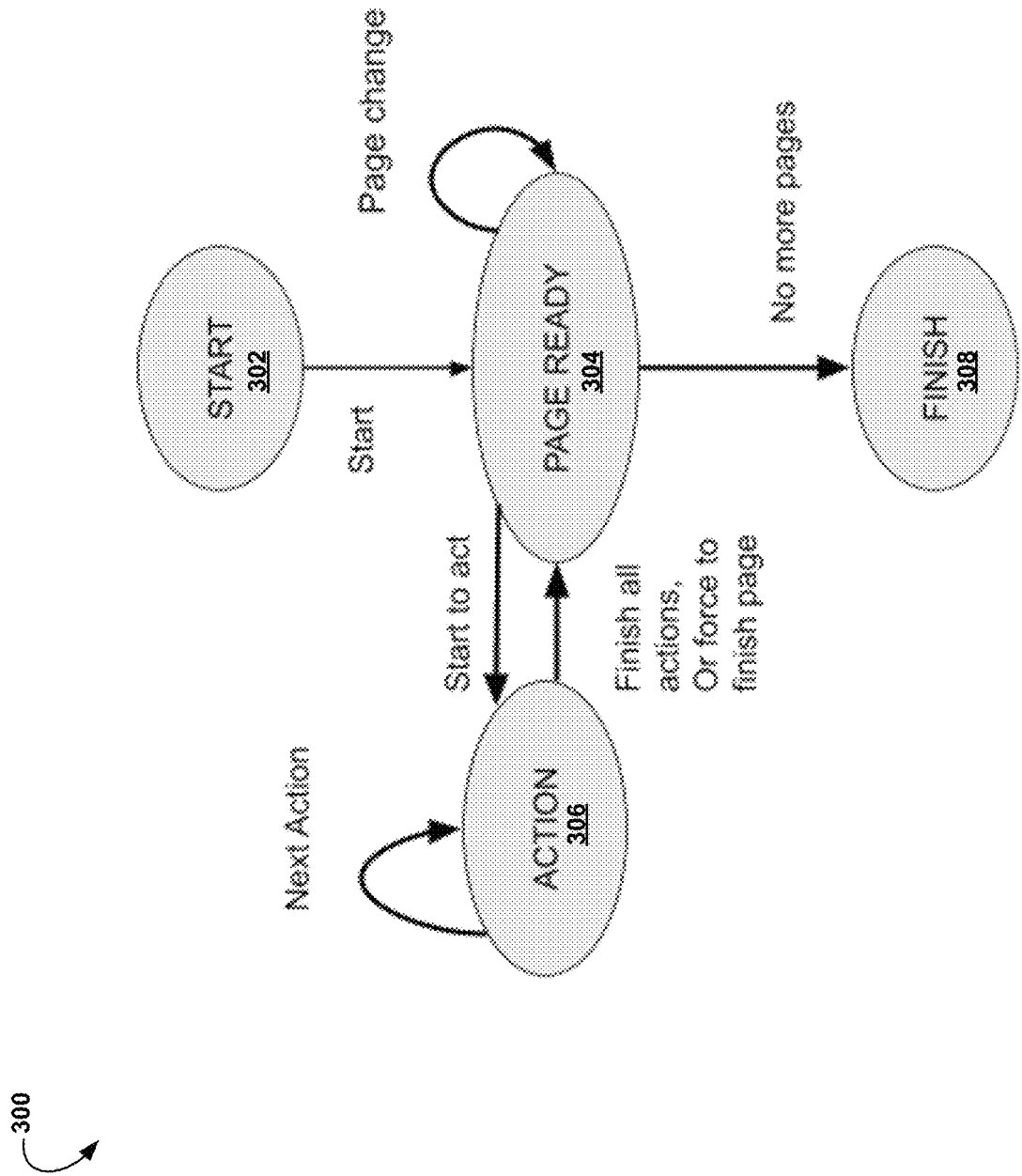
FIG. 3 shows an example of a state machine for presentation of interactive digital media using speech recognition.

FIG. 3 shows an example of a state machine 300 for presentation of interactive digital media using speech recognition. The state machine 300 controls how a media item executes, such as how the media item progresses or transitions between scenes as previously described. The state machine 300 is used during execution of the application that runs the media item. As previously described, logic of the state machine governs transitions between scenes of a media item. In some implementations, the logic causes a scene to be repeated unless one or more criteria are satisfied for transitioning to another scene. Specifically, for the state machine 300, a script is executed by a runtime interaction engine (RIE). The RIE implements a finite state automata that (i) manages the page level student experience (e.g., moving from one page to the next) and (ii) executes the script for the media content by following the page and action logic described in the script. The runtime interaction engine is responsible for the computational flow of the user (e.g., student) experience. The engine executes the script and the script includes different interaction types that together create an experience of consuming the media item.

A media type interaction script is configured to play the media and expects interaction with the user. The user may interact with the media item, for example by stopping a video. The media can be any one of sound, text, video, audio, vibration, image, etc. The input to the media type interaction is a description of the media itself (e.g., text), or a pointer to a file including the media (uniform resource locator (URL), a filename, etc.). Additional properties, such as a location to play the media on a string, or a relative location to an object, are also included. The output of the media type interaction is a log of the actions that the user performed for consuming the media item. The log data are used for the learning science artificial intelligence analysis of the use of the media item.

The state machine 300 includes a start state 302, a page ready state 304, an action state 304, and a finish state 308. The transitions between the states 302, 304, 306, and 308 are based on user actions or page availability. The start state 302 starts the media item at the beginning, such as a first page or first scene. The page ready 304 state is entered when the media item is awaiting a user action. The action state 306 is executed to process user action(s) for the scene. The finish state 308 occurs when no more scenes or pages are available for the media item.

The below code snippet includes an example of a JSON schema of an input to a media type (in YAML format).

```
type: seq sequence:
  - type: map mapping:
      media-id:
        type: any
      media-url:
        type: any text:
        type: any filename:
        type: any
```

The below code snippet shows an example of a media input in YAML format.
media-id: 1234.jpeg The below code snippet shows a JSON schema of the output of the media type in YAML format.

```
type: seq
sequence:
  - type: map
    allowempty: true
    mapping:
      user:
        type: any
          timepoint:
          type: any
            event:
            type: any
              data:
              type: any
```

The below code snippet shows a example media output in YAML format. Additional fields may be added as needed.

```
- user: 123
  media-id: 1234.jpeg
  timepoint: 0
  event: start
  data:
    index: 10
- user: 123
  timepoint: 10
  event: pause
  data:
    index: 10
- user: 123
  timepoint: 20
  event: start
  data:
    index: 10
```

The system is configured for a generated type interaction. The generated type interaction is configured to both generate new media for the media item and plays the media item. The input (see the input code snippet below) to the generated type interaction is the output from one of the other types.

The code snippet below shows a JSON schema of the generated type input in YAML format.
type: any The code snippet below shows a JSON schema of the generated type input in YAML format.

```
- user: 123
  response: "drive car home please"
  subject: "car"
  object: "home"
  intent: "drive"
  nlu-score: 0.98
  nlu-id: 34567
```

The input is then provided to a machine-learning algorithm designed to generate media. For example, an output of the NLU type interaction is the subject/object/intent of "car"/"drives"/"home". This output is given to the generated type machine-learning algorithm as input that then generates an image of a car driving to a home (see FIG. 8).

The image is then displayed using the media type interaction. The output (see the code snippet below) of the generated type is a record of the generation of the media, the location of the generated media, and a score indicating the closeness of the match between the input and the output (see the second code snippet below).

The code snippet below shows a JSON schema of the generated type output in YAML format.

```
type: map
allowempty: true
mapping:
  user:
    type: any
  generated-id:
    type: any
  nlu-id:
    type: any
  generated-score
    type: any
```

The code snippet below shows an example of the generated type output in YAML format.

```
user: 1234
generated-id: 789
nlu-id: 6789
generated-score: 0.9
media-id: 1234.jpeg
```

The system is configured for a regular type interaction. Generally, script accepts the sequence of interactions described in Table 2 below. The system prompts the user by playing an audio segment. The user can speaks (e.g., repeat) the audio segment. Automatic speech recognition translates the student's response into text, as previously described. The system computes a confidence score and compares it to the required score for the interaction. With a passing grade, a "successAction" script is executed, and the system runs the contingent animation associated with the prompt. Without a passing grade, the system executes a "failureAction" script in which a no animation is executed. Depending on the script, in some implementations, the system repeats the prompt again. In some implementations, the system transitions to a next part of the media item without playing a reward animation, but also allowing progression through the media item.

TABLE 2

High Level Algorithm for One Round of Contingent Interaction

| Step | Event |
|---|---|
| 1 | System plays audio "Cat's Pajamas" |
| 2 | Speech starts recognition system |
| 3 | Student says "Cat pajamas" |
| 4 | Speech recognition system recognizes "cat pajamas" |
| 5 | System stops speech recognition |
| 6 | System grades the student's response and computes the confidence metric. |
| 7 | Confidence metric value higher than required, resulting in a "successAction". |
| 8 | System runs the contingent animation. |

FIG. 4 shows an example of a state machine 400 for presentation of interactive digital media using speech recognition. A local execution of the regular action is itself a finite state automata 400 of FIG. 4. In the "regular" type of interaction, the finite state automata 400 causes audio to play. The state machine 400 switches to a listen node 404. In this node, the system listens for speech from the student. The listen node 404 returns to the regular action node 402 (e.g., similar to node 304 of state machine 300) when speech is recognized, when a timer goes off (with or without speech recognition), or when the maximum number of tries has occurred. In another variation, the transition to the listen node 404 occurs when the user performs an interaction (e.g., presses a button) to indicate that the user is about to speak.

The code snippet below shows an example of a JSON schema for regular input type interaction in YAML format.

```
type: map
allowempty: true
mapping:
  regular-id:
    type: any
  minimum-score:
    type: any
  expect:
    type: any
  duration:
    type: any
```

The code snippet below shows an example input for regular input type interaction in YAML format.

```
regular-id: 987
minimum-score: 0.5
expect: [ "cat", "cats", "kitty", "kitties" ]
duration: 5000
```

The code snippet below shows a JSON schema for regular type output interaction in YAML format.

```
type: seq
sequence:
- type: map
  mapping:
    regular-id:
      type: any
    user-id:
      type: any
    response:
      type: any
    regular-score:
      type: any
```

The code snippet below shows an example output for regular type output interaction in YAML format.

```
      - regular-id: 98
        user-id: 123
        response: doggies
        regular-score: 0.2
```

FIG. 5 shows an example of a state machine 500 for multi-type interaction for presentation of interactive digital media using speech recognition. Generally, the multi-type interaction is an extension of the regular interaction. For the multi-type interaction, multiple different choices are presented to the user and a voice is used to select one or more of the choices. For example, the audio might say "What do you see?" and the interface shows pictures of three animals (e.g., a horse, zebra, elephant). The user can say any of the three names of the animals and the system recognizes the match. The finite state automata 500 includes three states 502, 504, and 506. The states include a multi-state action node 502 for multi-action states. The multi-action state waits for a particular combination of actions to be performed by the user before determining success or failure. A listen node 504 performs listening for speech input, as previously described. A partially recognized node 506 tracks which parts of the interaction have been recognized. This state information is attached to the environment in which the script is executing.

Figure 6:
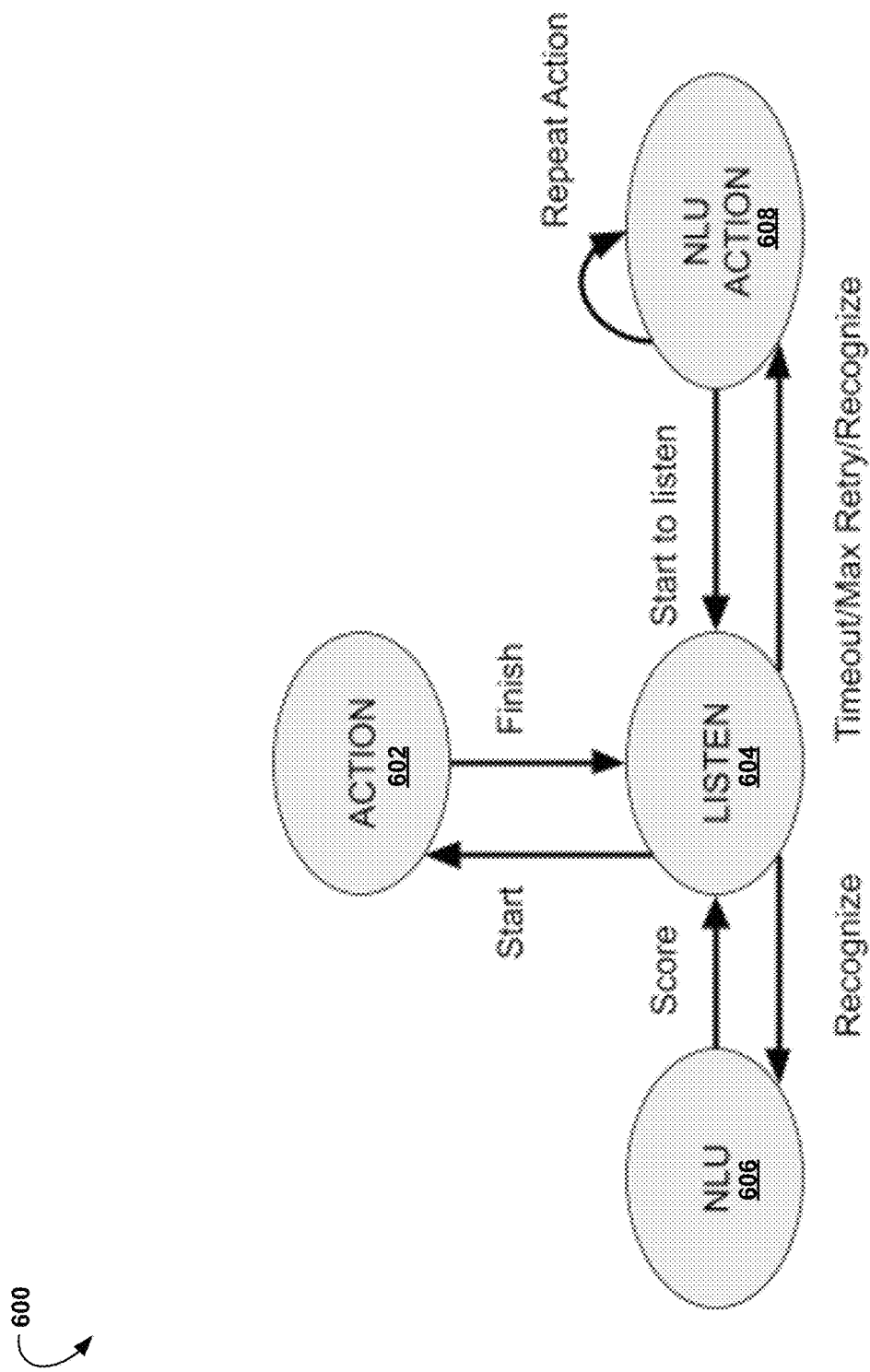
FIG. 6 shows an example of a state machine for presentation of interactive digital media using speech recognition.

FIG. 6 shows an example of a state machine 600 for natural language understanding (NLU) type interactions. In the natural language understanding NLU type action interaction state machine 600, an action state 602 sends an animation to the student and then listens for a response (e.g., at listen state 604). The user speaks (or presses a button and speaks). The recognized (partial) speech is sent to the NLU machine learning module at state 606 for analysis. The NLU module returns a score for each possible subject/object/intent triple. For example, a NLU target triple is ("car"/"drives"/"home") and the spoken text is "car goes home". The NLU analysis produces a high score for this comparison because a meaning between the target triple and the recognized speech are almost identical. The listen state 604 (node) includes logic that is configured to interprets this score and execute a corresponding action at state 608.

The code snippet below shows an example JSON schema of the NLU input type in YAML format.

```
      type: seq
      sequence:
      - type: map
        allowempty: true
        mapping:
          subject:
            type: any
          object:
            type: any
          intent:
            type: any
```

The code snippet below shows an example input for the NLU type in YAML format.

```
      - subject: [ "car", "cars", "automobile", "automobiles" ]
        object: [ "home", "house" ]
        intent: [ "drive", "go" ]
```

The code snippet below shows a JSON schema of the NLU output type in YAML format.

```
      type: seq
      sequence:
      -type: map
        allowempty: true
        mapping:
          user:
            type: any
          subject:
            type: any
          object:
            type: any
          intent:
            type: any
          response:
            type: any
          nlu-score:
            type: any
          nlu-id:
            type: any
```

The code snippet below shows an example output for the NLU type in YAML format.

```
      - user: 123
        response: "drive car home please"
        subject: "car"
        object: "home"
        intent: "drive"
        nlu-score: 0.98
        nlu-id: 6789
```

FIG. 7 shows an example of processing modules 700 that interact for generation and presentation of interactive digital media using speech recognition. The converse type interaction architecture is embedded in the conversation type action. The converse type action uses a blackboard architecture for communication between subcomponents 704, 706, 708, 710 of this action instead of a finite state automata The conversation type architecture has the following components. A dialogue interaction component 704 accepts automatic speech recognition and generates speech output. Output is also possible by calling an action. The data repository (blackboard) subcomponent 702 includes a collection of facts that are centrally recorded in a database and available to different components. The NLU subcomponent 706 performs natural language processing. The NLU component 706 recognizes speech data added to the blackboard 702, analyzes them, and then places the results of the analysis on the blackboard. The ML action component 710 recognizes NLU output data on the blackboard 702, analyzes these data, and generates actions that are added to the blackboard 702. The Natural Language Generation (NGL) subcomponent 708 performs natural language generation processing. The NGL component 708 recognizes actions data added to the blackboard 702, analyzes them, and then places natural language speech that complements the action on the blackboard. The dialogue interaction component 704 recognizes the NLG data added, along with the action data, and then calls the action to interact with the user.

Generally, processing of these data is asynchronous. In other words, any component can act after some passage of time. The asynchronous nature means that the typical back-and-forth interaction can be interrupted by either the user or the converse type system. For example, if the user does nothing for a certain amount of time, the lack of action is noted. In addition, through the blackboard 702, the conversation includes context from previous rounds of interaction, as recorded in the blackboard.

The input to a conversation type interaction consists of three different models. The NLU model is the same as the NLU type interaction. The model is populated with a set of subject/object/intent triples. The natural language generation model translates data in the blackboard into natural language. The ML actions component can decide any actions to call.

Figure 8:
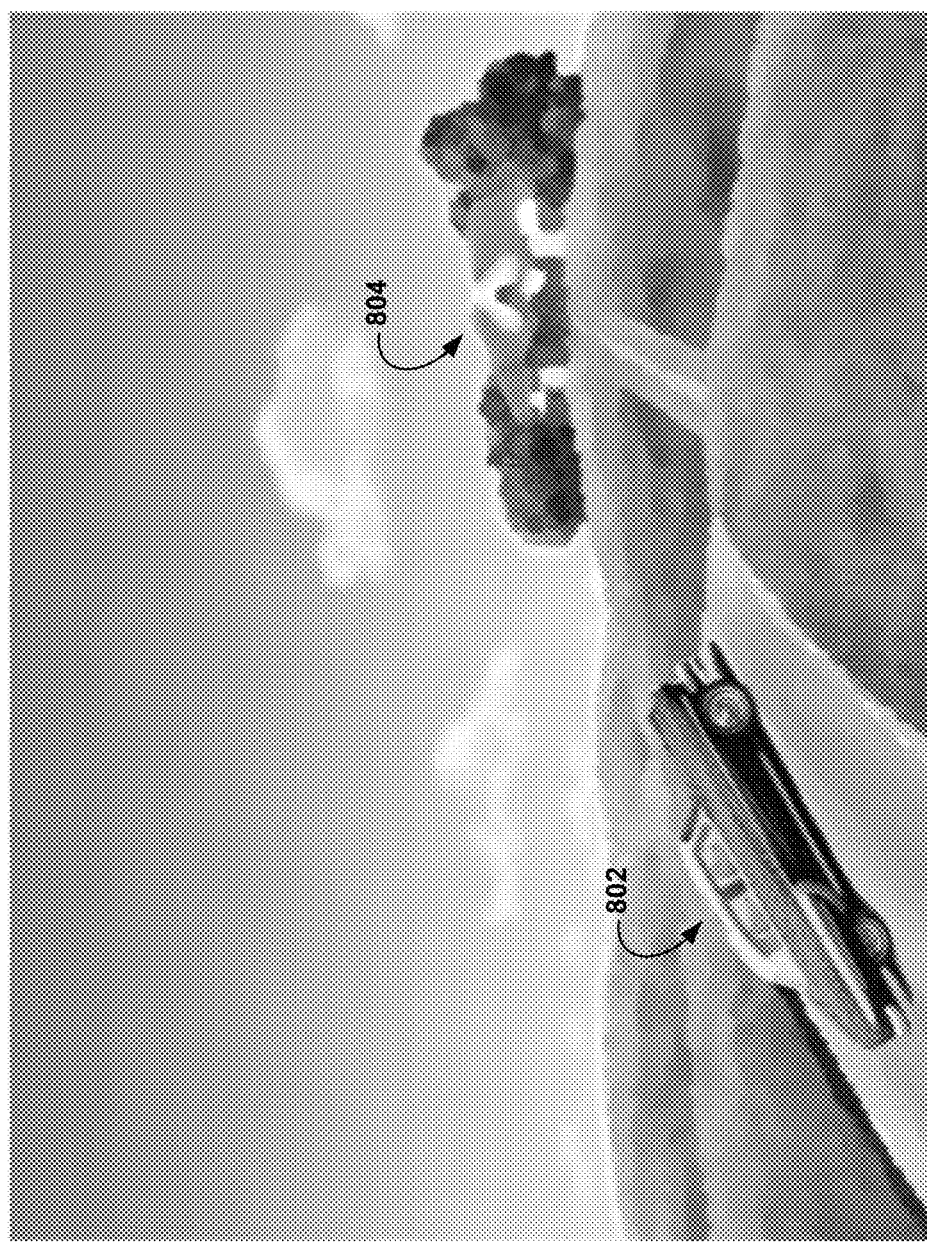
FIG. 8 is an example of a digital media image.
Figure 9:
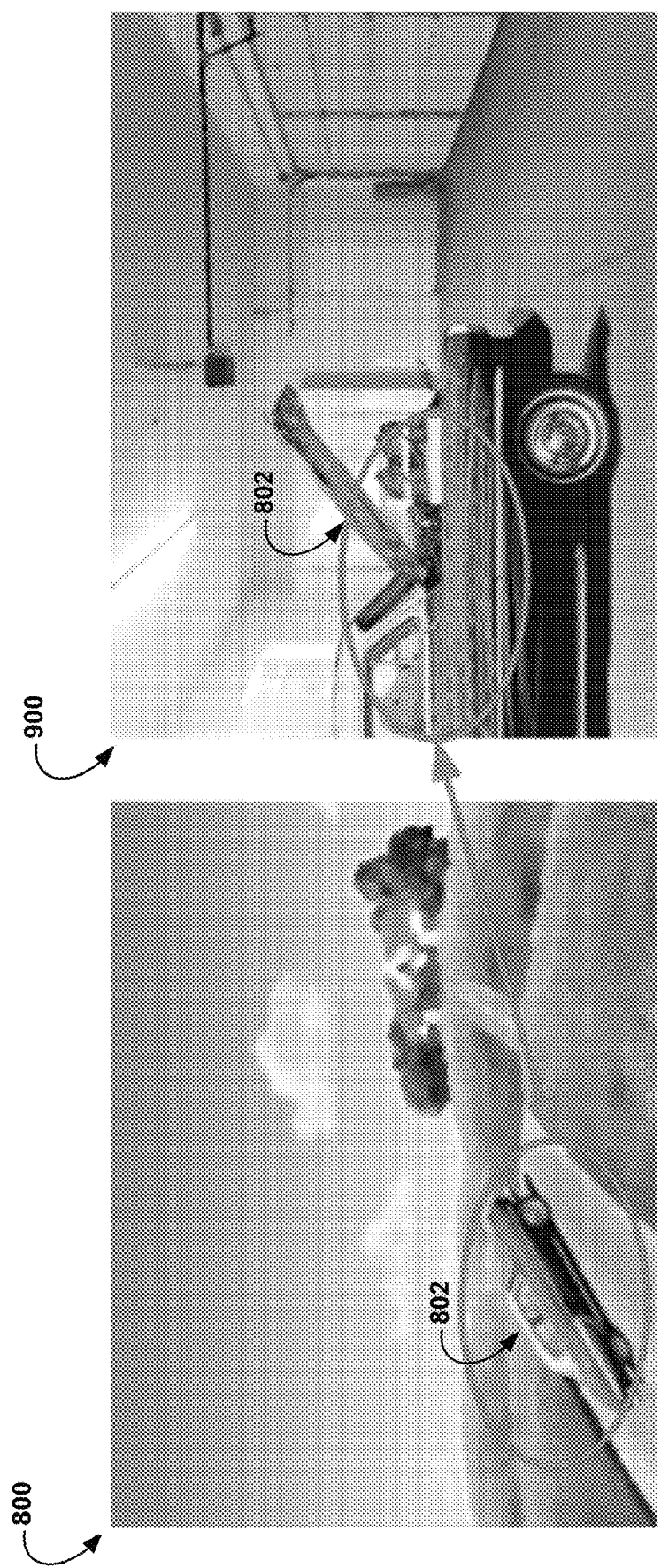
FIG. 9 is an example of a digital media item responsive to speech commands.

FIG. 8 is an example of a digital media image. A car 802 is shown on a road to a house 804. A user can interact with the story by indicating that the car 802 travel on the road to the house 804. FIG. 9 is an example of a digital media item responsive to speech commands. Once the car 802 gets to the house 804, the scene changes to a garage 900. The car 802 can be identified as present within the garage. This is an example of a compare and contrast type interaction. The compare and contrast type interaction is a specific form of NLU interaction focused on the activity of comparing and contrasting different (generated) media. In this type of interaction two or more media (e.g., 800, 900) are shown to the user. The input to this component is the following: (i) at least two inputs from other interactions, typically media interactions, (ii) an array of NLU inputs of the expected different responses by the student to the compare and contrast statements.

The system is configured for an evaluate type interaction. In the evaluate type interaction, the purpose of the interaction is to evaluate or assess the knowledge of the user. In addition to the typical evaluation of answering questions by touching the screen, the evaluation type interaction can also evaluate longer spoken replies by the user. This latter form of evaluation allows for more open-ended answers and for more flexible forms of answering.

The evaluation type interaction is implemented using the same design as the NLU type interaction. An additional field lists expected answers. Each expected answer has multiple variations. The evaluation action returns a score on how well the student answer matches the expected answers. The evaluation interaction could contain a questionnaire about the media experience (e.g., "What was checked on the car?") and accept variations of the answer as correct (e.g., "headlights", "lights", "the headlights"). Another variation of evaluation has the student interactively arrange a series of pictures into the order that they appear in the story as a method of measuring student comprehension.

The code snippet below shows an example JSON schema of the evaluation interaction input in YAML format.

```
type: map
mapping:
    evaluation-id:
        type: any
    segment:
        type: seq
        sequence:
        - type: map
          mapping:
            prompt-id:
                type: any
            questions:
                type: seq
                sequence:
                - type: map
                  mapping:
                    question-id:
                        type: any
                    content:
                        type: any
                    type:
                        type: any
                    credit:
                        type: any
                    position:
                        type: any
                    answers:
                        type: seq
                        sequence:
                        - type: any
```

The code snippet below shows an example input to the evaluation interaction in YAML format.

```
evaluation-id: 654 segment:
-prompt-id: 321
  questions:
  - question-id: 21
    content: "What was fixed on the car?" type: regular
    answers:
    - answer-id: 12
      answer: [ "bumper", "bumpers"] credit: 1
    - answer-id: 13
      answer: [ "headlight", "headlights" ]
      credit: 1
- prompt-id: 322
  questions:
    - question-id: 1
      content: "Put the pictures in the order of the story." type: ordering
      answers:
      - answer-id: 22
        position: 1
        answer:
          media-id: bigcar.jpeg
      - answer-id: 23
        position: 2 answer:
          media-id: crash.jpeg
      - answer-id: 24
        position: 3 answer:
          media-id: repair.jpeg
```

The code snippet below shows a JSON schema of the evaluation interaction output in YAML format.

```
type: seq
sequence:
-type: map
  mapping:
    user-id:
        type: any
    question-id:
        type: any
    answer-id:
        type: any
    answer:
        type: any
    score:
        type: any
    credit:
        type: any
```

The code snippet below shows an example output of the evaluation interaction in YAML format.

```
-user-id: 123
    question-id: 1 answers: [ 23, 22, 24 ]
    score: 0.5
    credit: 1
```

Figure 10:
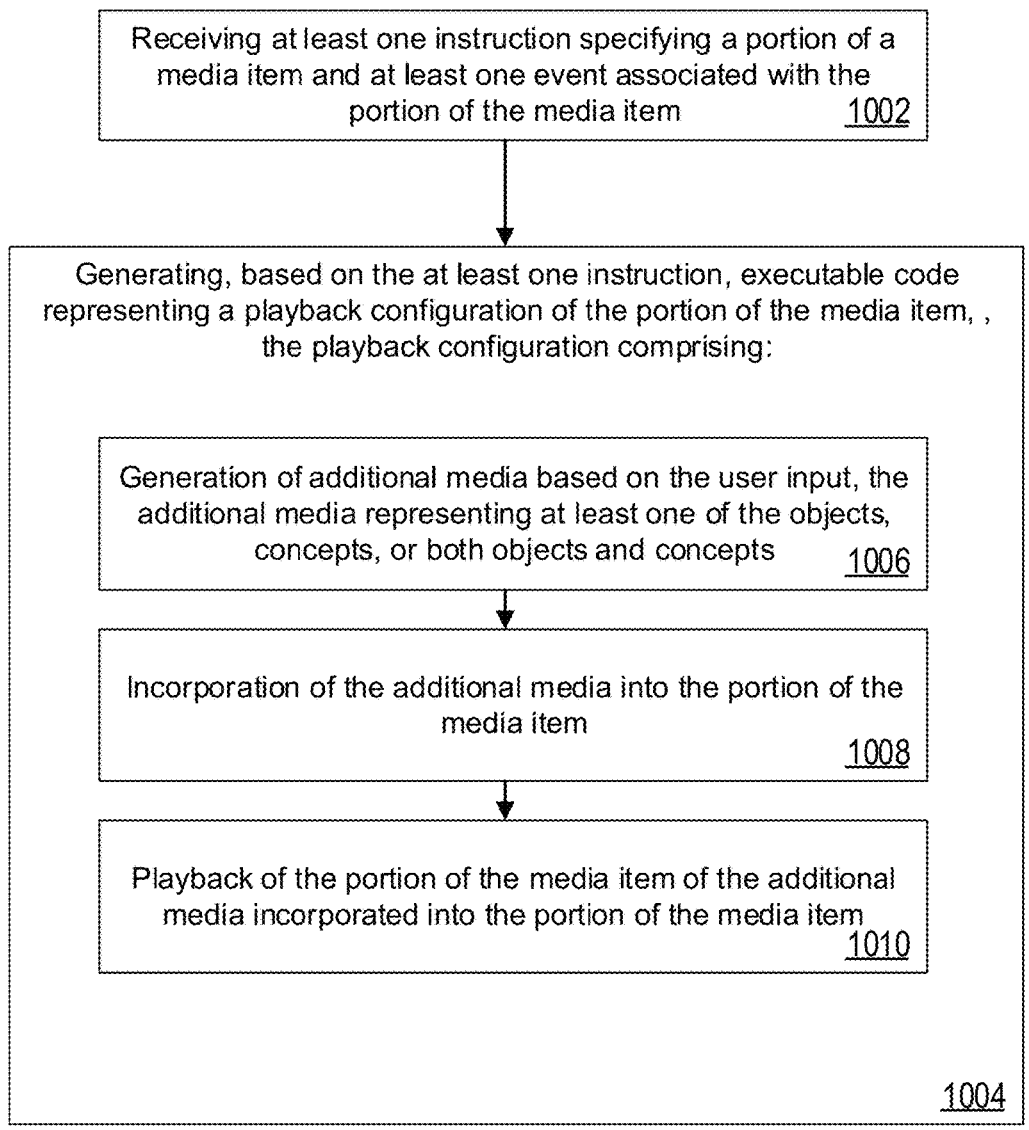
FIG. 10 is a flow diagram showing an example process for generating interactive digital media items that are responsive to speech commands.

FIG. 10 is a flow diagram showing an example process 1000 for generating interactive digital media items that are responsive to speech commands. The process 1000 can be performed by the systems previously described herein, such as the system 150 described in relation to FIG. 1B. For example, the process 1000 can be performed by a server system 108 that includes a data store configured to store one or more data items each representing at least a portion of a given media item, such as a digital book previously described. The system can include an interface in communication with the data store. The interface is configured to enable a user to input one or more instructions specifying a playback configuration for the given media item. As previously described, the instructions are configured to program, using the interface (e.g., an API) a configuration for presenting a digital book. The instructions are used to generate a new digital item. The system includes a controller in communication with the interface and the data store. The controller is configured to perform the process 1000 by performing operations. The operations include receiving (1002) at least one instruction specifying a portion of a media item and at least one event associated with the portion of the media item. Generally, the at least one event represents a solicitation of a user input to a playback device during playback of the portion of the media item by the playback device. As previously described, the solicitation can include a request for user input (such as a voice command) by the user or reader of the digital media item. The user input generally specifies one or more objects, concepts, or both objects and concepts related to the portion of the media item. For example, the user input specifies one or more objects or concepts presented on a screen for the portion of the digital media item. The objects can represent items included in a library of objects that is associated with the digital media item. The objects can be represented in the user interface. The concepts can include relationships between or among those objects, actions associated with the objects, or any relevant keywords, key phrases, gestures, or other user input that relates to the objects presented in the digital media item.

The process 1000 includes generating (1004), based on the at least one instruction, executable code representing a playback configuration of the portion of the media item. The executable code can represent the digital media item that executes for an application (e.g., a reader application) associated with the digital media item. The executable code can be executable on a processing device, such as a computing system described in relation to FIG. 13.

The playback configuration comprising several features. For example, the playback configuration includes a generation (1006) of additional media based on the user input. The additional media represents at least one of the objects, concepts, or both objects and concepts of the user input (e.g., a voice command, gesture, etc.). The playback configuration includes an incorporation (1008) of the additional media into the portion of the media item. The additional media can include another object, concept, etc. retrieved from the library of objects associated with the digital media item, the additional media not being previously presented in the digital media item. The playback configuration includes a playback (1010) of the portion of the media item of the additional media incorporated into the portion of the media item. The user, by the server system, can configure digital media items that are interactive and responsive to voice commands. The digital media item playback is based on receiving the voice commands, performing processing on the voice commands (such as natural language processing), and determining how to continue presenting the digital media item based on what is included within the voice command, as previously described. The playback of the digital media item therefore is configured to change based on the feedback received by or interactions detected from a user of the digital media item during presentation of the digital media item to the user.

In some implementations, the process 1000 includes receiving a plurality of instructions each specifying a respective portion of the media item and at least one event associated with the respective portion of the media item. Each respective portion of the media item is different from other portions of the media item. The event can include a specific occurrence of a presentation of a portion of the media item. For example, the event can include the end or beginning of a chapter, a page turn, a satisfaction of one or more criteria specified by the media item, and so forth. For a respective portion of the media item, the process 1000 includes determining at least one criterion for playback of the respective portion of the media item. The process 1000 includes determining at least one reward included in the playback of the portion of the media item responsive to satisfying the at least one criterion, the reward including the additional media. The process 1000 includes determining an order of the different portions of the media item for chronological playback of the media item. The process 1000 includes generating, based on the order, the executable code representing the playback configuration of the portions of the media item together in an interactive media item, the playback configuration including, for each portion of the media item, the at least one reward included in the playback of the portion of the media item responsive to satisfying the at least one criterion.

In some implementations, the event comprises a detection, by a sensor associated with a playback device configured to execute the executable code, of an audio signal representing a term or a phrase specified in the instruction. In some implementations, the playback comprises, responsive to the event, an animation of at least a portion of a visual presentation. In some implementations, the portion of the visual presentation comprises an object that is described by the term or the phrase specified in the instruction. In some implementations, the event comprises a detection, by a sensor associated with a playback device configured to execute the executable code, of a lack of an audio signal responsive to playback of the portion of the media item. In some implementations, the playback comprises, responsive to the event, a repeat of the playback of the portion the media item without an animation.

In some implementations, the media item comprises an electronic book, and wherein the portion of the media item comprises a page of the electronic book. In some implementations, the data store comprises a cloud based data store. In some implementations, the interface comprises an application programming interface (API).

Figure 11:
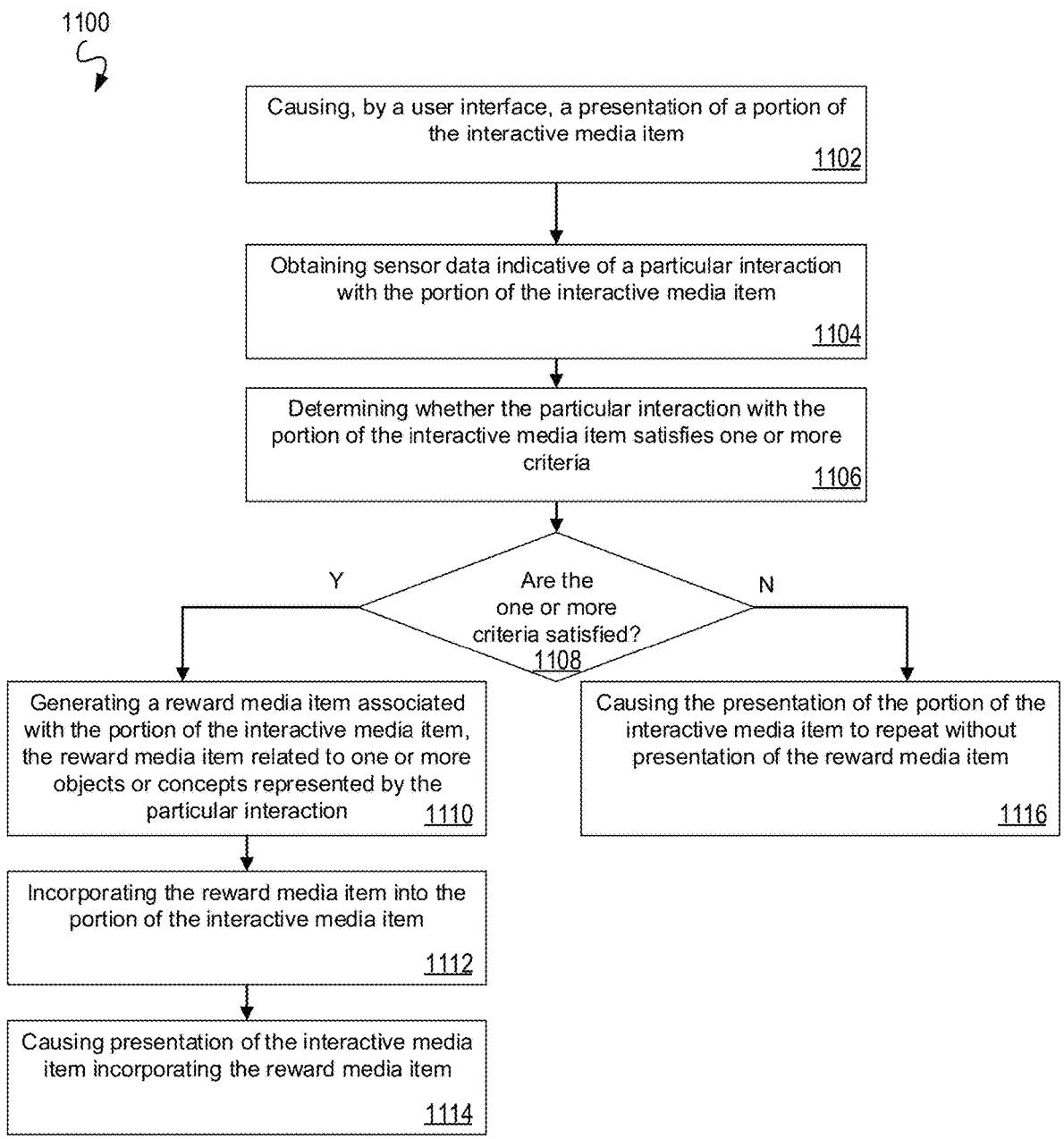
FIG. 11 is a flow diagram showing an example process for presenting interactive digital media items that are responsive to speech commands.

FIG. 11 is a flow diagram showing an example process 1100 for presenting interactive digital media items that are responsive to speech commands. The process 1100 can be performed by a client device, such as the device 102 or 104 previously described in relation to FIG. 1A. The device is configured for presenting an interactive media item. The device includes a user interface configured to present portions of an interactive media item to a user. The device includes at least one sensor configured to measure an interaction of the user with the user interface and generate sensor data representing the interaction. The sensor can include a microphone for receiving voice commands, a touch screen for receiving touch inputs, a camera for receiving gestures, and so forth. The device include a controller configured to receive the sensor data from the at least one sensor. The controller is configured to perform the operations of process 1100. The operations of process 1100 include causing (1102), by the user interface, a presentation of a portion of the interactive media item. The presentation includes displaying a scene (such as a video clip, image, etc.) of the media item. The presentation can include a display of text on the screen that is used with the image or video clip.

The operations of the process 1100 include obtaining (1104) sensor data indicative of a particular interaction with the portion of the interactive media item. The interaction can include a voice command, a gesture, a touch input, and so forth.

The operations of the process 1100 include determining (1106) whether the particular interaction with the portion of the interactive media item satisfies one or more criteria. The one or more criteria can include recitation of a particular keyword or key phrase, touching of a specific object or objects presented in the user interface, performing a particular gesture, answering a question correctly when the question is presented in the media item, or any combination thereof.

When the device determines (1108) that the one or more criteria are satisfied, the operations include generating (1110) a reward media item associated with the portion of the interactive media item. The reward media item is related to one or more objects or concepts represented by the particular interaction. For example, the reward item can include playing an animation related to an object or concept presented in the user interface, playing a sound related to an object or concept, advancing the presentation of the digital media item to a new portion (e.g., a new page, chapter, line of text, etc.), and so forth.

The operations include incorporating (1112) the reward media item into the portion of the interactive media item. The operations include causing (1114) presentation of the interactive media item incorporating the reward media item. For example, the presentation including the reward media item can include advancing the story of the media item, playing an animation related to the object or concept in the media item, and so forth.

In some implementations, the operations include, in response to determining (1108) that the one or more criteria are not satisfied, causing (1116) the presentation of the portion of the interactive media item to repeat without presentation of the reward media item. For example, the media item may repeat a question, re-solicit input from the user, replay an animation that was already played, repeat text presentation to the user, and so forth.

Figure 12:
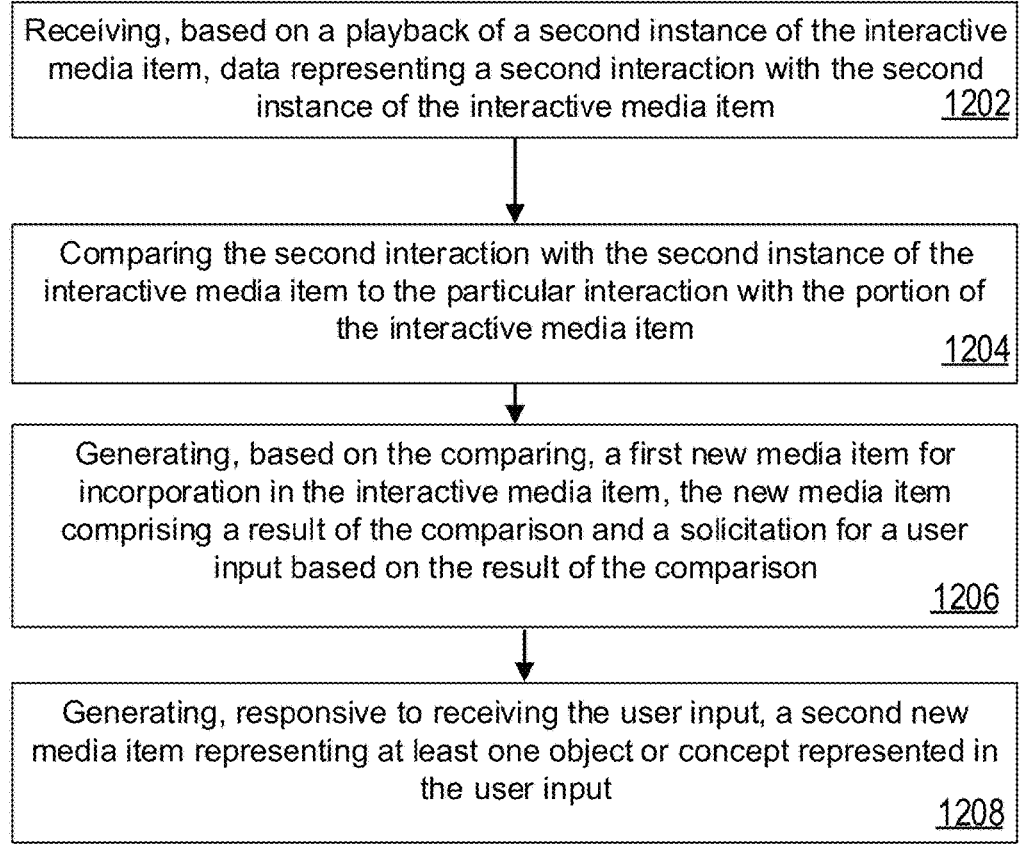
FIG. 12 is a flow diagram showing an example process for presenting interactive digital media items that are responsive to speech commands.

FIG. 12 is a flow diagram showing an example process 1200 for presenting interactive digital media items that are responsive to speech commands. The operations of process 1200 can be used for presenting the media item, such as described in relation to FIG. 11. For example, the operations of process 1200 can be performed by a device, such as devices 102 and 104 of FIG. 1A. The process 1200 includes receiving (1202), based on a playback of a second instance of the interactive media item, data representing a second interaction with the second instance of the interactive media item. Here, a second instance of the media item includes a second presentation of the media item, such as on a second, different device than the device presenting the digital media item in process 1100. The two instances of the media item can be identical. The two instances of the media item can be played concurrently (e.g., to different users or an audience of the same user or users).

The devices can record the responses of each user. The process 1200 includes comparing (1206) the second interaction with the second instance of the interactive media item to the particular interaction with the portion of the interactive media item. The comparing can include determining if the interactions are the same or different. For example, the interaction for the first instance of the media item can include selection, by the user, of a first object in the presentation of a particular scene in the media item. The second interaction can include selection, by another user (or the same user) of a second, different object in the presentation of the same particular scene in the second instance of the media item. For example, a first user might select a cat when prompted, while the second user selects a dog when prompted, when the dog and cat are presented together. The user might be making this selection in response to a prompt in the media item, such as "Select the cat!" or "Which of these animals likes to play with yarn?" Here, two users are included, but the media item can be configured to record the interactions of multiple users over a period of time (e.g. how often to readers correctly select the cat, relative to selection of the dog or another incorrect selection).

The process 1200 can include generating (1208), based on the comparing, a first new media item for incorporation in the interactive media item. The new media item includes a result of the comparison and a solicitation for a user input based on the result of the comparison. For example, the comparison can include a determination of how often users correctly answer the prompt for an interaction. In an example, if the question is too hard, and too few users correctly respond, the media item may advance regardless of the response, and indicate the correct answer to the user. In another example, the media item can indicate what other users answered in response to the prompt without indication of a correct answer. For example, if a prompt is an open-ended request (e.g., "Name your favorite animal!"), the media item may indicate example answers of other users. In some implementations, the media item may provide additional media associated with the user's answer or the answers of other users, such as an animation of the most common animals mentioned in user responses and/or the animal represented in the user's response. In this way, the process 1200 can include generating (1208), responsive to receiving the user input, a second new media item representing at least one object or concept represented in the user input.

In some implementations, the sensor data comprises a representation of an audio signal including a term or a phrase. For example, the sensor data can include voice commands. In some implementations, the one or more criteria comprise detection, by the sensor, of an audio signal including a predetermined term or phrase, such as a voice command. In some implementations, a reward media item comprises animation of an object included in the portion of the interactive media item, the object being described by the term or the phrase. For example, the reward item can include an animation of an animal mentioned in a voice reply to a prompt. In some implementations, the sensor comprises a microphone. In some implementations, the sensor comprises a camera, and wherein the sensor data comprises a video.

In some implementations, the one or more criteria comprise detection of a gesture or action by the user, and wherein the controller is configured to detect one or more gestures of the user in the video.

In some implementations, the interactive media item comprises an electronic book, and wherein the portion of the interactive media item comprises a page of the electronic book. In some implementations, the sensor comprises a touch sensor.

In some implementations, the one or more criteria comprise detection of a touch signal representing touching of a particular object presented in the portion of the interactive media item.

Figure 13:
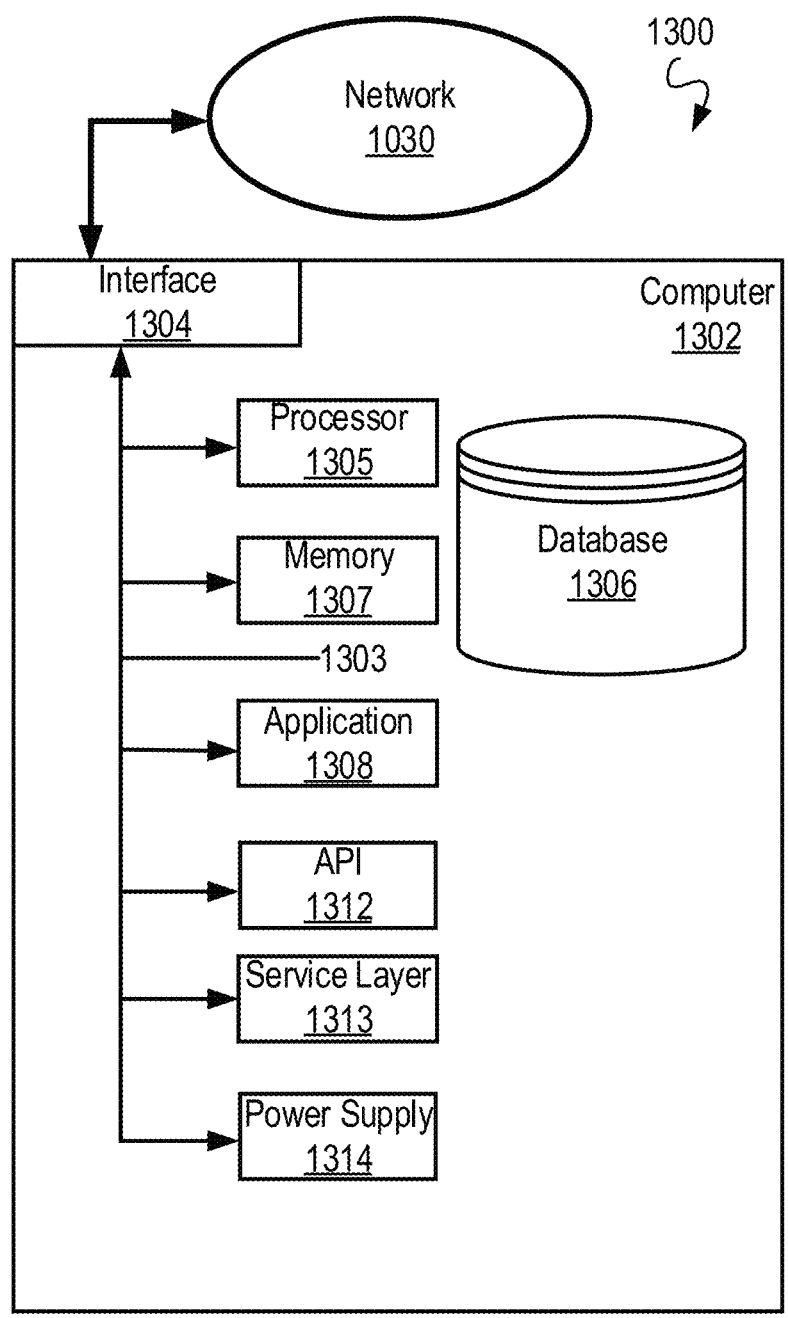
FIG. 13 is a block diagram of an example computer system used to provide computational functionalities associated with described algorithms, methods, functions, processes, flows, and procedures described in the present disclosure.

FIG. 13 is a block diagram of an example computer system 1300 used to provide computational functionalities associated with described algorithms, methods, functions, processes, flows, and procedures described in the present disclosure (such as the method 200 described previously with reference to FIG. 2), according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a high level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both), over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 1307 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1302, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system including computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Figure 14:
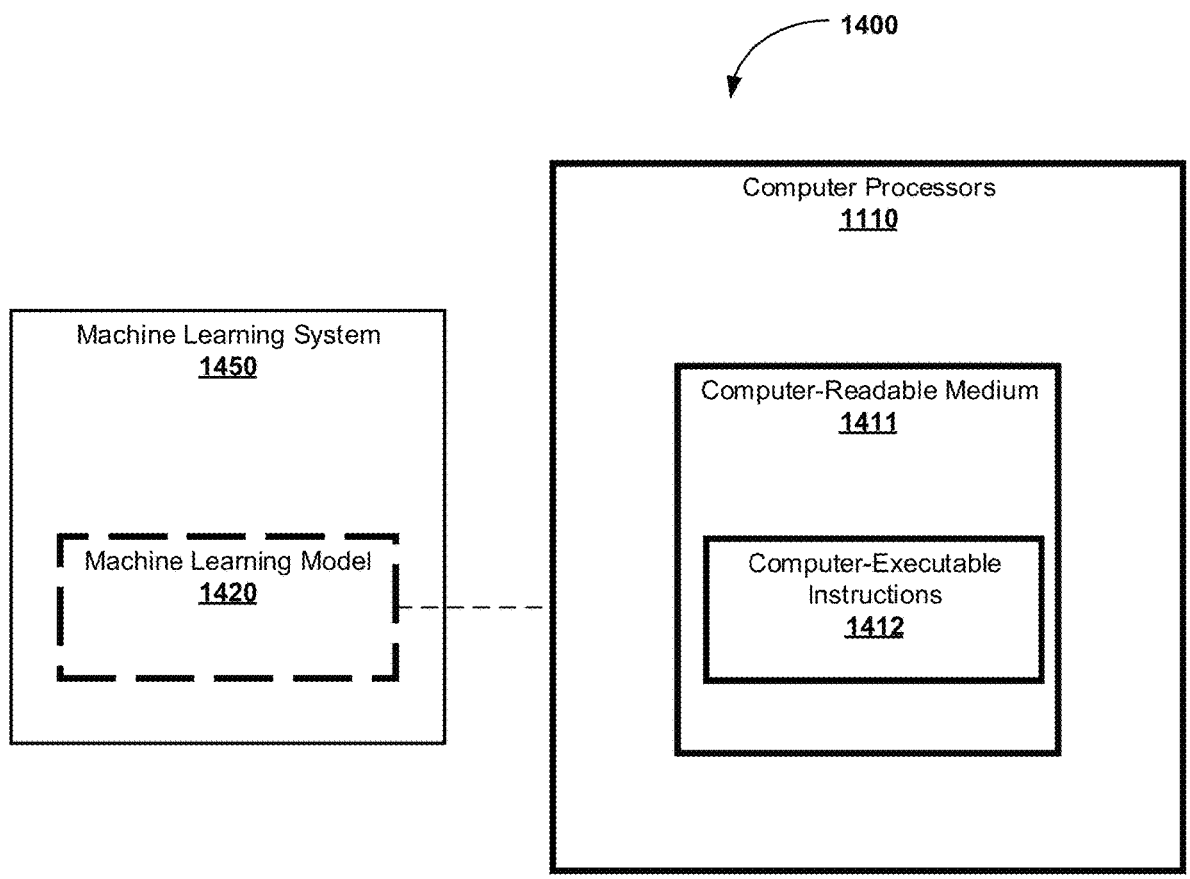
FIG. 14 is a diagram illustrating an example computer system configured to execute a machine learning model.

FIG. 14 is a diagram illustrating an example computer system 1400 configured to execute a machine learning model. The system 1400 includes computer processors 1410. The computer processors 1410 include computer-readable memory 1411 and computer readable instructions 1412. The system 1400 also includes a machine learning system 1450. The machine learning system 1450 includes a machine learning model 1420. The machine learning model 1420 can be separate from or integrated with the computer processors 1410.

The computer-readable medium 1411 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 1411 includes code-segment having executable instructions.

In some implementations, the computer processors 1410 include a general purpose processor. In some implementations, the computer processors 1410 include a central processing unit (CPU). In some implementations, the computer processors 1410 include at least one application specific integrated circuit (ASIC). The computer processors 1410 can also include general purpose programmable microprocessors, graphic processing units, special-purpose programmable microprocessors, digital signal processors (DSPs), programmable logic arrays (PLAs), field programmable gate arrays (FPGA), special purpose electronic circuits, etc., or a combination thereof. The computer processors 1410 are configured to execute program code means such as the computer-executable instructions 1412 and configured to execute executable logic that includes the machine learning model 1420.

The computer processors 1410 are configured to receive data indicating a molecular structure of, for example, a drug. The data can be obtained through one or more means, such as wireless communications with databases, optical fiber communications, USB, CD-ROM, and so forth.

The machine learning system 1450 is capable of applying machine learning techniques to train the machine learning model 1420. As part of the training of the machine learning model 1420, the machine learning system 1450 forms a training set of input data by identifying a positive training set of input data items that have been determined to have the property in question, and, in some embodiments, forms a negative training set of input data items that lack the property in question.

The machine learning system 1450 extracts feature values from the input data of the training set, the features being variables deemed potentially relevant to whether or not the input data items have the associated property or properties. An ordered list of the features for the input data is herein referred to as the feature vector for the input data. In one embodiment, the machine learning system 1450 applies dimensionality reduction (e.g., via linear discriminant analysis (LDA), principle component analysis (PCA), or the like) to reduce the amount of data in the feature vectors for the input data to a smaller, more representative set of data.

In some implementations, the machine learning system 1450 uses supervised machine learning to train the machine learning models 1420 with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model 1420, when applied to the feature vector extracted from the input data item, outputs an indication of whether the input data item has the property in question, such as a Boolean yes/no estimate, or a scalar value representing a probability.

In some embodiments, a validation set is formed of additional input data, other than those in the training sets, which have already been determined to have or to lack the property in question. The machine learning system 1450 applies the trained machine learning model 1420 to the data of the validation set to quantify the accuracy of the machine learning model 1420. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have the property in question (TP+FN or false negatives). The F score (F-score=2*PR/(P+R)) unifies precision and recall into a single measure. In one embodiment, the machine learning module iteratively re-trains the machine learning model until the occurrence of a stopping condition, such as the accuracy measurement indication that the model is sufficiently accurate, or a number of training rounds having taken place.

In some implementations, the machine learning model 1420 is a convolutional neural network (CNN). A CNN can be configured based on a presumption that inputs to the CNN correspond to image pixel data for an image or other data that includes features at multiple spatial locations. For example, sets of inputs can form a multi-dimensional data structure, such as a tensor, that represent color features of an example digital image (e.g., a biological image of biological tissue). In some implementations, inputs to the CNN correspond to a variety of other types of data, such as data obtained from different devices and sensors of a vehicle, point cloud data, audio data that includes certain features or raw audio at each of multiple time steps, or various types of one-dimensional or multiple dimensional data. A convolutional layer of the CNN can process the inputs to transform features of the image that are represented by inputs of the data structure. For example, the inputs are processed by performing dot product operations using input data along a given dimension of the data structure and a set of parameters for the convolutional layer.

Performing computations for a convolutional layer can include applying one or more sets of kernels to portions of inputs in the data structure. The manner in which CNN performs the computations can be based on specific properties for each layer of an example multi-layer neural network or deep neural network that supports deep neural net workloads. A deep neural network can include one or more convolutional towers (or layers) along with other computational layers. In particular, for example computer vision applications, these convolutional towers often account for a large proportion of the inference calculations that are performed. Convolutional layers of a CNN can have sets of artificial neurons that are arranged in three dimensions, a width dimension, a height dimension, and a depth dimension. The depth dimension corresponds to a third dimension of an input or activation volume and can represent respective color channels of an image. For example, input images can form an input volume of data (e.g., activations), and the volume has dimensions 32×32×3 (width, height, depth respectively). A depth dimension of 3 can correspond to the RGB color channels of red (R), green (G), and blue (B).

In general, layers of a CNN are configured to transform the three dimensional input volume (inputs) to a multi-dimensional output volume of neuron activations (activations). For example, a 3D input structure of 32×32×3 holds the raw pixel values of an example image, in this case an image of width 32, height 32, and with three color channels, R,G,B. A convolutional layer of a CNN of the machine learning model 1420 computes the output of neurons that may be connected to local regions in the input volume. Each neuron in the convolutional layer can be connected only to a local region in the input volume spatially, but to the full depth (e.g., all color channels) of the input volume. For a set of neurons at the convolutional layer, the layer computes a dot product between the parameters (weights) for the neurons and a certain region in the input volume to which the neurons are connected. This computation may result in a volume such as 32×32×12, where 12 corresponds to a number of kernels that are used for the computation. A neuron's connection to inputs of a region can have a spatial extent along the depth axis that is equal to the depth of the input volume. The spatial extent corresponds to spatial dimensions (e.g., x and y dimensions) of a kernel.

A set of kernels can have spatial characteristics that include a width and a height and that extends through a depth of the input volume. Each set of kernels for the layer is applied to one or more sets of inputs provided to the layer. That is, for each kernel or set of kernels, the machine learning model 1420 can overlay the kernel, which can be represented multi-dimensionally, over a first portion of layer inputs (e.g., that form an input volume or input tensor), which can be represented multi-dimensionally. For example, a set of kernels for a first layer of a CNN may have size 5×5×3×16, corresponding to a width of 5 pixels, a height of 5 pixel, a depth of 3 that corresponds to the color channels of the input volume to which to a kernel is being applied, and an output dimension of 16 that corresponds to a number of output channels. In this context, the set of kernels includes 16 kernels so that an output of the convolution has a depth dimension of 16.

The machine learning model 1420 can then compute a dot product from the overlapped elements. For example, the machine learning model 1420 can convolve (or slide) each kernel across the width and height of the input volume and compute dot products between the entries of the kernel and inputs for a position or region of the image. Each output value in a convolution output is the result of a dot product between a kernel and some set of inputs from an example input tensor. The dot product can result in a convolution output that corresponds to a single layer input, e.g., an activation element that has an upper-left position in the overlapped multi-dimensional space. As discussed above, a neuron of a convolutional layer can be connected to a region of the input volume that includes multiple inputs. The machine learning model 1420 can convolve each kernel over each input of an input volume. The machine learning model 1420 can perform this convolution operation by, for example, moving (or sliding) each kernel over each input in the region.

The machine learning model 1420 can move each kernel over inputs of the region based on a stride value for a given convolutional layer. For example, when the stride is set to 1, then the machine learning model 1420 can move the kernels over the region one pixel (or input) at a time. Likewise, when the stride is 2, then the machine learning model 1420 can move the kernels over the region two pixels at a time. Thus, kernels may be shifted based on a stride value for a layer and the machine learning model 1420 can repeatedly perform this process until inputs for the region have a corresponding dot product. Related to the stride value is a skip value. The skip value can identify one or more sets of inputs (2×2), in a region of the input volume, that are skipped when inputs are loaded for processing at a neural network layer. In some implementations, an input volume of pixels for an image can be "padded" with zeros, e.g., around a border region of an image. This zero-padding is used to control the spatial size of the output volumes.

As discussed previously, a convolutional layer of CNN is configured to transform a three dimensional input volume (inputs of the region) to a multi-dimensional output volume of neuron activations. For example, as the kernel is convolved over the width and height of the input volume, the machine learning model 1420 can produce a multi-dimensional activation map that includes results of convolving the kernel at one or more spatial positions based on the stride value. In some cases, increasing the stride value produces smaller output volumes of activations spatially. In some implementations, an activation can be applied to outputs of the convolution before the outputs are sent to a subsequent layer of the CNN.

An example convolutional layer can have one or more control parameters for the layer that represent properties of the layer. For example, the control parameters can include a number of kernels, K, the spatial extent of the kernels, F, the stride (or skip), S, and the amount of zero padding, P. Numerical values for these parameters, the inputs to the layer, and the parameter values of the kernel for the layer shape the computations that occur at the layer and the size of the output volume for the layer. In some implementations, the spatial size of the output volume is computed as a function of the input volume size, W, using the formula (W−F+2P)/S+1. For example, an input tensor can represent a pixel input volume of size [227×227×3]. A convolutional layer of a CNN can have a spatial extent value of F=11, a stride value of S=4, and no zero-padding (P=0). Using the above formula and a layer kernel quantity of K=116, the machine learning model 1420 performs computations for the layer that results in a convolutional layer output volume of size [55×55×156], where 55 is obtained from [(227−11+0)/4+1=55].

The computations (e.g., dot product computations) for a convolutional layer, or other layers, of a CNN involve performing mathematical operations, e.g., multiplication and addition, using a computation unit of a hardware circuit of the machine learning model 1420. The design of a hardware circuit can cause a system to be limited in its ability to fully utilize computing cells of the circuit when performing computations for layers of a neural network.

In the previous description, for the purposes of explanation, numerous specific details are set forth in order to provide a thorough understanding of the present disclosure. However, the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference is made in detail to implementations, examples of which are illustrated in the accompanying drawings. In the previous description, numerous specific details are set forth in order to provide a thorough understanding of the various described implementations. However, it are apparent to one of ordinary skill in the art that the various described implementations may be practiced without these specific details. In other instances, well-known methods, procedures, components, circuits, and networks have not been described in detail so as not to unnecessarily obscure aspects of the implementations.

Several features are described that can each be used independently of one another or with any combination of other features. However, any individual feature may not address any of the problems discussed above or might only address one of the problems discussed above. Some of the problems discussed above might not be fully addressed by any of the features described in this specification. Although headings are provided, data related to a particular heading, but not found in the section having that heading, may also be found elsewhere in this description.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component (for example, as a data server), or that includes a middleware component (for example, an application server). Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms included in such claims shall govern the meaning of such terms as used in the claims. In addition, when we use the term "further comprising" or "further including" in the foregoing description or following claims, what follows this phrase can be an additional step or entity, or a sub-step/sub-entity of a previously-recited step or entity.

Particular implementations of the subject matter have been described. Other implementations, alterations, and permutations of the described implementations are within the scope of the following claims as are apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it are understood that various modifications may be made without departing from the spirit and scope of this disclosure.

What is claimed is:

1. A server system, comprising:
   a data store configured to store one or more data items each representing at least a portion of a given media item;
   an interface in communication with the data store, the interface configured to enable a user to input one or more instructions specifying a playback configuration for the given media item;
   a controller in communication with the interface and the data store, the controller configured to perform operations comprising:
      receiving at least one instruction specifying a portion of a media item and at least one event associated with the portion of the media item, the at least one event representing a solicitation of a user input to a playback device during playback of the portion of the media item by the playback device when the playback of the media portion is associated with a first state, the user input specifying one or more objects, concepts, or both objects and concepts related to the portion of the media item;
      generating, based on the at least one instruction, executable code representing a playback configuration of the portion of the media item, the playback configuration comprising:
         generation of additional media based on the user input, the additional media representing at least one of the objects, concepts, or both objects and concepts specified in the user input when the playback of the portion of the media item is associated with the first state;
         incorporation of the additional media into the portion of the media item, the additional media representing at least one of the objects, concepts, or both objects and concepts specified in the user input when the playback of the portion of the media item is associated with the first state, the incorporation of the additional media representing a constructive media experience relative to one or more prior states; and in a second state associated with the playback of the media item, causing a playback of the portion of the media item including the additional media incorporated into the portion of the media item, the playback of the portion of the media item in the second state being based on which of the at least one of the objects, concepts, or both objects and concepts are specified in the user input.

2. The server system of claim 1, the operations further comprising:

receiving a plurality of instructions each specifying a respective portion of the media item and at least one event associated with the respective portion of the media item, each respective portion of the media item being different from other portions of the media item;

for a respective portion of the media item,
determining at least one criterion for playback of the respective portion of the media item; and
determining at least one reward included in the playback of the portion of the media item responsive to satisfying the at least one criterion, the reward including the additional media;

determining an order of the different portions of the media item for chronological playback of the media item; and generating, based on the order, the executable code representing the playback configuration of the portions of the media item together in an interactive media item, the playback configuration including, for each portion of the media item, the at least one reward included in the playback of the portion of the media item responsive to satisfying the at least one criterion.

3. The server system of claim 1, wherein the event comprises a detection, by a sensor associated with a playback device configured to execute the executable code, of an audio signal representing a term or a phrase specified in the instruction.

4. The server system of claim 3, wherein the playback comprises, responsive to the event, an animation of at least a portion of a visual presentation.

5. The server system of claim 4, wherein the portion of the visual presentation comprises an object that is described by the term or the phrase specified in the instruction.

6. The server system of claim 1, wherein the event comprises a detection, by a sensor associated with a playback device configured to execute the executable code, of a lack of an audio signal responsive to playback of the portion of the media item.

7. The server system of claim 6, wherein the playback comprises, responsive to the event, a repeat of the playback of the portion the media item without an animation.

8. The server system of claim 1, wherein the media item comprises an electronic book, and wherein the portion of the media item comprises a page of the electronic book.

9. The server system of claim 1, wherein the data store comprises a cloud based data store.

10. The server system of claim 1, wherein the interface comprises an application programming interface (API).

11. A device configured for presenting an interactive media item, the device comprising:

a user interface configured to present portions of an interactive media item to a user;

at least one sensor configured to measure an interaction of the user with the user interface and generate sensor data representing the interaction; and a controller configured to receive the sensor data from the at least one sensor, the controller configured to perform operations comprising:

causing, by the user interface, a presentation of a portion of the interactive media item;

obtaining sensor data indicative of a particular interaction with the portion of the interactive media item;

determining whether the particular interaction with the portion of the interactive media item satisfies one or more criteria that are based on a state associated with the portion of the interactive media item, a meaning of the particular interaction being interpreted based on the state, the meaning of the particular interaction representing a constructive media experience relative to one or more prior states;

in response to determining that the one or more criteria are satisfied:
generating a reward media item associated with the portion of the interactive media item, the reward media item related to one or more objects or concepts represented by the particular interaction;
incorporating the reward media item into the portion of the interactive media item; and
causing presentation of the interactive media item incorporating the reward media item;

in response to determining that the one or more criteria are not satisfied, causing the presentation of the portion of the interactive media item to repeat without presentation of the reward media item.

12. The device of claim 11, wherein the operations further comprise:

receiving, based on a playback of a second instance of the interactive media item, data representing a second interaction with the second instance of the interactive media item;

comparing the second interaction with the second instance of the interactive media item to the particular interaction with the portion of the interactive media item;

generating, based on the comparing, a first new media item for incorporation in the interactive media item, the new media item comprising a result of the comparison and a solicitation for a user input based on the result of the comparison; and generating, responsive to receiving the user input, a second new media item representing at least one object or concept represented in the user input.

13. The device of claim 11, wherein the sensor data comprises a representation of an audio signal including a term or a phrase.

14. The device of claim 11, wherein the one or more criteria comprise detection, by the sensor, of an audio signal including a predetermined term or phrase.

15. The device of claim 14, wherein the reward media item comprises animation of an object included in the portion of the interactive media item, the object being described by the term or the phrase.

16. The device of claim 11, wherein the sensor comprises a microphone.

17. The device of claim 11, wherein the sensor comprises a camera, and wherein the sensor data comprises a video.

18. The device of claim 17, wherein the one or more criteria comprise detection of a gesture or action by the user, and wherein the controller is configured to detect one or more gestures of the user in the video.

19. The device of claim 11, wherein the interactive media item comprises an electronic book, and wherein the portion of the interactive media item comprises a page of the electronic book.

20. The device of claim 11, wherein the sensor comprises a touch sensor.

21. The device of claim 20, wherein the one or more criteria comprise detection of a touch signal representing touching of a particular object presented in the portion of the interactive media item.

* * * * *

UNITED STATES PATENT AND TRADEMARK OFFICE
CERTIFICATE OF CORRECTION

| | | |
|---|---|---|
| PATENT NO. | : 12,444,415 B2 | Page 1 of 1 |
| APPLICATION NO. | : 17/974272 | |
| DATED | : October 14, 2025 | |
| INVENTOR(S) | : Anthony Tomasic et al. | |

It is certified that error appears in the above-identified patent and that said Letters Patent is hereby corrected as shown below:

On the Title Page

Item (72) Inventors: Anthony Tomasic, delete "Forth Worth, TX (US);" and insert -- Fort Worth, TX (US); --

Signed and Sealed this
Thirtieth Day of December, 2025

John A. Squires
*Director of the United States Patent and Trademark Office*